United States Patent
Luo et al.

(10) Patent No.: US 11,533,749 B2
(45) Date of Patent: Dec. 20, 2022

(54) IN-ADVANCE SCHEDULING FOR LOW-LATENCY TRAFFIC

(71) Applicant: QUALCOMM Incorporated, San Diego, CA (US)

(72) Inventors: Jianghong Luo, Skillman, NJ (US); Navid Abedini, Somerset, NJ (US); Junyi Li, Chester, NJ (US); Luca Blessent, Whitehouse Station, NJ (US); Tao Luo, San Diego, CA (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 16/854,649

(22) Filed: Apr. 21, 2020

(65) Prior Publication Data

US 2020/0351930 A1 Nov. 5, 2020

Related U.S. Application Data

(60) Provisional application No. 62/841,792, filed on May 1, 2019.

(51) Int. Cl.
*H04W 72/14* (2009.01)
*H04W 72/04* (2009.01)
(Continued)

(52) U.S. Cl.
CPC ........... *H04W 72/14* (2013.01); *H04L 1/0061* (2013.01); *H04L 1/1819* (2013.01); *H04W 24/08* (2013.01);
(Continued)

(58) Field of Classification Search
CPC ............. H04W 72/14; H04W 72/1294; H04W 72/1273; H04W 72/0446; H04W 72/1289;
(Continued)

(56) References Cited

U.S. PATENT DOCUMENTS

2018/0014296 A1   1/2018 Li et al.
2021/0058826 A1*  2/2021 Mao ................. H04W 28/0804
(Continued)

OTHER PUBLICATIONS

Ericsson: "IAB Semi-Static Configuration for DU Resources", 3GPP Draft, 3GPP TSG-RAN WG1 Meeting AH-1901, R1-1900732, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593579, 4 pages, Retrieved from the Internet: URL: http://www.3gpp.org/ftp/Meetings%5F3GPP%5FSYNC/RAN1/Docs/R1%2D1900732%2Ezip, [retrieved on Jan. 20, 2019], Section 4.

(Continued)

*Primary Examiner* — Kent Krueger
(74) *Attorney, Agent, or Firm* — Holland & Hart LLP

(57) ABSTRACT

Methods, systems, and devices for wireless communications are described. A first wireless device may receive, from a second wireless device, a first downlink grant scheduling a first downlink resource for a delay-sensitive packet. The first wireless device may monitor the first downlink resource for the delay-sensitive packet from the second wireless device and identify a first routing identifier indicating at least a third wireless device in the first downlink grant. The first wireless device may transmit, to the third wireless device, a second downlink grant scheduling a second downlink resource and including a second routing identifier based on the first routing identifier. In some cases, the first wireless node may send a scheduling grant to the third wireless device for transmission of a delay-sensitive packet for a next hop before completion of processing of the packet received from the second wireless device.

26 Claims, 22 Drawing Sheets

(51) Int. Cl.
    *H04W 72/12*    (2009.01)
    *H04L 1/00*     (2006.01)
    *H04L 1/18*     (2006.01)
    *H04W 24/08*    (2009.01)

(52) U.S. Cl.
    CPC ... *H04W 72/0446* (2013.01); *H04W 72/1273* (2013.01)

(58) Field of Classification Search
    CPC .......... H04W 72/1242; H04W 24/08; H04L 1/0061; H04L 1/1819
    See application file for complete search history.

(56) References Cited

U.S. PATENT DOCUMENTS

| | | | | |
|---|---|---|---|---|
| 2021/0153189 | A1* | 5/2021 | Jo | H04W 72/04 |
| 2021/0160861 | A1* | 5/2021 | You | H04W 72/042 |
| 2021/0235332 | A1* | 7/2021 | Schmidt | H04W 36/08 |
| 2021/0298000 | A1* | 9/2021 | Park | H04W 56/001 |

OTHER PUBLICATIONS

Interdigital (Rapporteur): "Summary of [104#38] [NR/IIOT] Intra UE Prioritization UL Data Data (Interdigital)" 3GPP Draft, 3GPP TSG-RAN WG2 Meeting #105, R2-1901458 (R16 NR_IIOT SI AI1173 Summary of 104_38NR_IIOT Intra UE Prioritization UL Data Data), 3rd Generation Partnership Project (3GPP), Mobile Competence Centre, 650, Route Des Luciol, vol. RAN WG2, No. Athens, Greece, Feb. 25, 2019-Mar. 1, 2019, Feb. 15, 2019 (Feb. 15, 2019), XP051597375, 28 Pages, Retrieved from the Internet: URL: http://www.3gpp.org/ftp/tsg%5Fran/WG2%5FRL2/TSGR2%5F105/Docs/R2%2D1901458%2Ezip, [retrieved on Feb. 15, 2019], Questions 8 and 9.

International Search Report and Written Opinion—PCT/US2020/029254—ISAEPO—dated Jul. 7, 2020.

Nokia, et al., "Discussion on Enhancements to Scheduling/HARQ for NR URLLC", 3GPP Draft, 3GPP TSG RAN WG1 Meeting #96bis, R1-1904829 NR URLLC Scheduling HARQ Enhancements, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 3, 2019 (Apr. 3, 2019), XP051707328, 6 Pages, Retrieved from the Internet: URL: http://www.3gpp.org/ftp/tsg%5Fran/WG1%5FRL1/TSGR1%5F96b/Docs/R1%2D1904829%2Ezip, [retrieved on Apr. 3, 2019], Chapter 3, "Intra-UE DL Prioritization".

Qualcomm Inc (Rapporteur): "Report on Configuration for Routing and QoS Support in Arch Group", 3GPP Draft, 3GPP TSG-RAN WG2 Meeting #102, Draft R2-1809100—Configuration for Routing and QOS Support in ARCH Group 1—FINAL, 3rd Generation Partnership Project (3GPP), Mobile Competence Centre, 650, Route Des Lucioles, F-0692 Vol. RAN WG2, No. Busan, South Korea, May 21, 2018-May 25, 2018, Jun. 19, 2018 (Jun. 19, 2018), XP051546032, 9 Pages, Retrieved from the Internet: URL: http://www.3gpp.org/ftp/Email%5FDiscussions/RAN2/[RAN2%23102]/[102%2368][NR]IAB, [retrieved on Jun. 19, 2018], Section 1, table 1, p. 8, pp. 2-4 table proposal.

* cited by examiner

IN-ADVANCE SCHEDULING FOR LOW-LATENCY TRAFFIC

CROSS REFERENCE

The present application for patent claims the benefit of U.S. Provisional Patent Application No. 62/841,792 by LUO et al., entitled "IN-ADVANCE SCHEDULING FOR LOW-LATENCY TRAFFIC," filed May 1, 2019, assigned to the assignee hereof, and expressly incorporated by reference herein.

FIELD OF THE INVENTION

The following relates generally to wireless communications, and more specifically to in-advance scheduling for low latency traffic.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support multiple types of communications, where the traffic for the different types of communications may have different priorities. Current scheduling techniques for low-latency or delay-sensitive communications in these systems, however, have deficiencies.

SUMMARY

The described techniques relate to improved methods, systems, devices, and apparatuses that support in-advance scheduling for low latency traffic. Generally, the described techniques provide for sending a downlink control information (DCI) grant to a next hop of an integrated access and backhaul network (IAB) prior to completion of processing a received packet. The IAB may support low latency communications or delay-sensitive communications and support techniques for reducing latency. For example, the wireless communications system may support in-advance scheduling for delay sensitive traffic. A DCI grant used for in-advance scheduling (e.g., to schedule a downlink resource for a delay-sensitive packet) may include routing information for a next hop for the delay-sensitive packet. By including the routing information in the DCI grant, the child node (e.g., receiving the DCI grant) may be able to transmit a DCI grant to the next hop prior to completion of processing the delay-sensitive packet.

An IAB relay node may receive a DCI grant from a parent node. If a routing identifier is included in the DCI grant, the IAB relay node may identify the next hop child node from the routing identifier and determine whether in-advance scheduling is to be used for the transmission to the next hop. If in-advance scheduling is used, the IAB relay node may send a DCI grant for the next hop to the identified child node before the IAB relay node finishes processing the delay-sensitive data packet received from the parent node. The IAB relay node may then transmit the delay-sensitive downlink packet to the child node based on the DCI grant. In some cases, the DCI grant for the next hop may include delay-sensitive routing information (e.g., a routing identifier) regardless of whether the in-advance scheduling is adopted at the IAB relay node, as the in-advance scheduling may be implemented at child nodes or grandchild nodes.

A method of wireless communications at a first wireless device is described. The method may include receiving, from a second wireless device, a first downlink grant scheduling a first downlink resource for a delay-sensitive packet, monitoring the first downlink resource for the delay-sensitive packet from the second wireless device, identifying a first routing identifier in the first downlink grant, the first routing identifier indicating at least a third wireless device, and transmitting, to the third wireless device, a second downlink grant scheduling a second downlink resource.

An apparatus for wireless communications at a first wireless device is described. The apparatus may include a processor, memory in electronic communication with the processor, and instructions stored in the memory. The instructions may be executable by the processor to cause the apparatus to receive, from a second wireless device, a first downlink grant scheduling a first downlink resource for a delay-sensitive packet, monitor the first downlink resource for the delay-sensitive packet from the second wireless device, identify a first routing identifier in the first downlink grant, the first routing identifier indicating at least a third wireless device, and transmit, to the third wireless device, a second downlink grant scheduling a second downlink resource.

Another apparatus for wireless communications at a first wireless device is described. The apparatus may include means for receiving, from a second wireless device, a first downlink grant scheduling a first downlink resource for a delay-sensitive packet, monitoring the first downlink resource for the delay-sensitive packet from the second wireless device, identifying a first routing identifier in the first downlink grant, the first routing identifier indicating at least a third wireless device, and transmitting, to the third wireless device, a second downlink grant scheduling a second downlink resource.

A non-transitory computer-readable medium storing code for wireless communications at a first wireless device is described. The code may include instructions executable by a processor to receive, from a second wireless device, a first downlink grant scheduling a first downlink resource for a delay-sensitive packet, monitor the first downlink resource for the delay-sensitive packet from the second wireless device, identify a first routing identifier in the first downlink grant, the first routing identifier indicating at least a third wireless device, and transmit, to the third wireless device, a second downlink grant scheduling a second downlink resource.

Some examples of the method, apparatuses, and non-transitory computer-readable medium described herein may further include operations, features, means, or instructions for determining a processing time for processing the delay-sensitive packet, where the second downlink grant may be transmitted prior to an end of the processing time.

In some examples of the method, apparatuses, and non-transitory computer-readable medium described herein, the second downlink grant may be transmitted prior to the end of the processing time based on a scheduling gap between the second downlink grant and the second downlink resource for transmitting the delay-sensitive packet.

Some examples of the method, apparatuses, and non-transitory computer-readable medium described herein may further include operations, features, means, or instructions for identifying the third wireless device from a routing table based on the first routing identifier.

Some examples of the method, apparatuses, and non-transitory computer-readable medium described herein may further include operations, features, means, or instructions for configuring the routing table including identifiers for a set of wireless devices.

Some examples of the method, apparatuses, and non-transitory computer-readable medium described herein may further include operations, features, means, or instructions for establishing a data bearer with at least the second wireless device and the third wireless device, where the routing table may be configured during a data bearer setup phase to establish the data bearer.

Some examples of the method, apparatuses, and non-transitory computer-readable medium described herein may further include operations, features, means, or instructions for receiving the delay-sensitive packet from the second wireless device on the first downlink resource based on the monitoring.

Some examples of the method, apparatuses, and non-transitory computer-readable medium described herein may further include operations, features, means, or instructions for transmitting the delay-sensitive packet to the third wireless device on the second downlink resource based on the second downlink grant.

Some examples of the method, apparatuses, and non-transitory computer-readable medium described herein may further include operations, features, means, or instructions for processing the delay-sensitive packet successfully, where the delay-sensitive packet may be transmitted to the third wireless device based on processing the delay-sensitive packet successfully.

Some examples of the method, apparatuses, and non-transitory computer-readable medium described herein may further include operations, features, means, or instructions for determining a low priority data packet may be scheduled for the second downlink resource, dropping transmission of the low priority data packet, and transmitting the delay-sensitive packet on the second downlink resource based on the determining.

Some examples of the method, apparatuses, and non-transitory computer-readable medium described herein may further include operations, features, means, or instructions for determining a low priority data packet may be scheduled for the first downlink resource, dropping reception of the low priority data packet, and monitoring for the delay-sensitive packet on the first downlink resource based on the determining.

Some examples of the method, apparatuses, and non-transitory computer-readable medium described herein may further include operations, features, means, or instructions for receiving a cancellation indication from the second wireless device, and ceasing to monitor the first downlink resource for the delay-sensitive packet.

Some examples of the method, apparatuses, and non-transitory computer-readable medium described herein may further include operations, features, means, or instructions for processing the delay-sensitive packet, determining the delay-sensitive packet may be unsuccessfully processed based on a cyclic redundancy check of the delay-sensitive packet, and transmitting a cancellation indication to the third wireless device based on transmitting the second downlink grant.

Some examples of the method, apparatuses, and non-transitory computer-readable medium described herein may further include operations, features, means, or instructions for transmitting feedback information to the second wireless device with HARQ feedback for the delay-sensitive packet based on monitoring for the delay-sensitive packet on the first downlink resource, where the feedback information includes scheduling information associated with the second downlink grant, the second downlink resource, or both.

Some examples of the method, apparatuses, and non-transitory computer-readable medium described herein may further include operations, features, means, or instructions for receiving updated scheduling information from the second wireless device based on the feedback information, where the updated scheduling information indicates a different transmission from the second wireless device may be scheduled for the first wireless device on the second downlink resource.

Some examples of the method, apparatuses, and non-transitory computer-readable medium described herein may further include operations, features, means, or instructions for receiving feedback information for the delay-sensitive packet from the third wireless device, where the feedback information includes scheduling information associated with a third downlink grant, a third downlink resource, or both, and scheduling another transmission for the third downlink resource based on the feedback information.

Some examples of the method, apparatuses, and non-transitory computer-readable medium described herein may further include operations, features, means, or instructions for identifying a downlink control channel occasion, where the second downlink grant may be transmitted in the downlink control channel occasion, and where the identifying of the downlink control channel occasion may be based on a scheduling gap between the second downlink grant and the second downlink resource.

In some examples of the method, apparatuses, and non-transitory computer-readable medium described herein, the scheduling gap spans a set of slots.

In some examples of the method, apparatuses, and non-transitory computer-readable medium described herein, the scheduling gap spans a single slot, the single slot including a set of mini-slots.

Some examples of the method, apparatuses, and non-transitory computer-readable medium described herein may further include operations, features, means, or instructions for processing the delay-sensitive packet, the processing including decoding the delay-sensitive packet, processing Layer 2 information of the delay-sensitive packet, encoding the delay-sensitive packet for transmission, or any combination thereof.

In some examples of the method, apparatuses, and non-transitory computer-readable medium described herein, the first wireless device and may be an integrated access and backhaul (IAB) node of an IAB network, and the second wireless device may be a parent node of the IAB network which schedules the IAB node.

In some examples of the method, apparatuses, and non-transitory computer-readable medium described herein, the parent node may be another IAB node or an IAB donor node of the IAB network.

In some examples of the method, apparatuses, and non-transitory computer-readable medium described herein, the third wireless device may be a child node of the first wireless device, where the child node may be an integrated access and backhaul (IAB) node of an IAB network or a UE of the IAB network.

Some examples of the method, apparatuses, and non-transitory computer-readable medium described herein may further include operations, features, means, or instructions for indicating to the third wireless device, via the second downlink grant, that downlink control information carrying the second downlink grant supports in-advance scheduling.

Some examples of the method, apparatuses, and non-transitory computer-readable medium described herein may further include operations, features, means, or instructions for identifying, based on the first downlink grant, that downlink control information carrying the first downlink grant supports in-advance scheduling.

In some examples of the method, apparatuses, and non-transitory computer-readable medium described herein, the second downlink grant includes a second routing identifier based on the first routing identifier.

A method of wireless communications at a first wireless device is described. The method may include receiving, from a second wireless device, an uplink delay-sensitive packet, determining a processing time for processing the uplink delay-sensitive packet at the first wireless device, transmitting, prior to an end of the processing time, a scheduling request to a third wireless device based on the uplink delay-sensitive packet, receiving, from the third wireless device, an uplink grant for transmitting the uplink delay-sensitive packet, and transmitting the uplink delay-sensitive packet to the third wireless device based on the uplink grant.

An apparatus for wireless communications at a first wireless device is described. The apparatus may include a processor, memory in electronic communication with the processor, and instructions stored in the memory. The instructions may be executable by the processor to cause the apparatus to receive, from a second wireless device, an uplink delay-sensitive packet, determine a processing time for processing the uplink delay-sensitive packet at the first wireless device, transmit, prior to an end of the processing time, a scheduling request to a third wireless device based on the uplink delay-sensitive packet, receive, from the third wireless device, an uplink grant for transmitting the uplink delay-sensitive packet, and transmit the uplink delay-sensitive packet to the third wireless device based on the uplink grant.

Another apparatus for wireless communications at a first wireless device is described. The apparatus may include means for receiving, from a second wireless device, an uplink delay-sensitive packet, determining a processing time for processing the uplink delay-sensitive packet at the first wireless device, transmitting, prior to an end of the processing time, a scheduling request to a third wireless device based on the uplink delay-sensitive packet, receiving, from the third wireless device, an uplink grant for transmitting the uplink delay-sensitive packet, and transmitting the uplink delay-sensitive packet to the third wireless device based on the uplink grant.

A non-transitory computer-readable medium storing code for wireless communications at a first wireless device is described. The code may include instructions executable by a processor to receive, from a second wireless device, an uplink delay-sensitive packet, determine a processing time for processing the uplink delay-sensitive packet at the first wireless device, transmit, prior to an end of the processing time, a scheduling request to a third wireless device based on the uplink delay-sensitive packet, receive, from the third wireless device, an uplink grant for transmitting the uplink delay-sensitive packet, and transmit the uplink delay-sensitive packet to the third wireless device based on the uplink grant.

Some examples of the method, apparatuses, and non-transitory computer-readable medium described herein may further include operations, features, means, or instructions for transmitting a routing identifier for the uplink delay-sensitive packet with the scheduling request.

In some examples of the method, apparatuses, and non-transitory computer-readable medium described herein, the routing identifier includes an identifier for one or more wireless devices, the routing identifier indicating for the third wireless device to transmit the uplink delay-sensitive packet to at least one of the one or more wireless devices.

Some examples of the method, apparatuses, and non-transitory computer-readable medium described herein may further include operations, features, means, or instructions for receiving, from the second wireless device, routing identifiers for a set of wireless devices, and determining a set of transmission paths from the first wireless device to a donor node, where the scheduling request may be transmitted to the third wireless device based on a shortest transmission path of the set of transmission paths.

In some examples of the method, apparatuses, and non-transitory computer-readable medium described herein, the first wireless device may be an integrated access and backhaul (IAB) node of an IAB network, the second wireless device may be a child node scheduled by the IAB node in the IAB network, the third wireless device may be a parent node scheduling the IAB node in the IAB network.

In some examples of the method, apparatuses, and non-transitory computer-readable medium described herein, the child node may be another IAB node or a UE.

In some examples of the method, apparatuses, and non-transitory computer-readable medium described herein, the parent node may be another IAB node or an IAB donor node.

Some examples of the method, apparatuses, and non-transitory computer-readable medium described herein may further include operations, features, means, or instructions for establishing a data bearer with at least the second wireless device and the third wireless device, where a routing table may be configured during a data bearer setup phase to establish the data bearer, and a routing identifier for the delay-sensitive packet may be identified based on the routing table.

DETAILED DESCRIPTION

Figure 1:
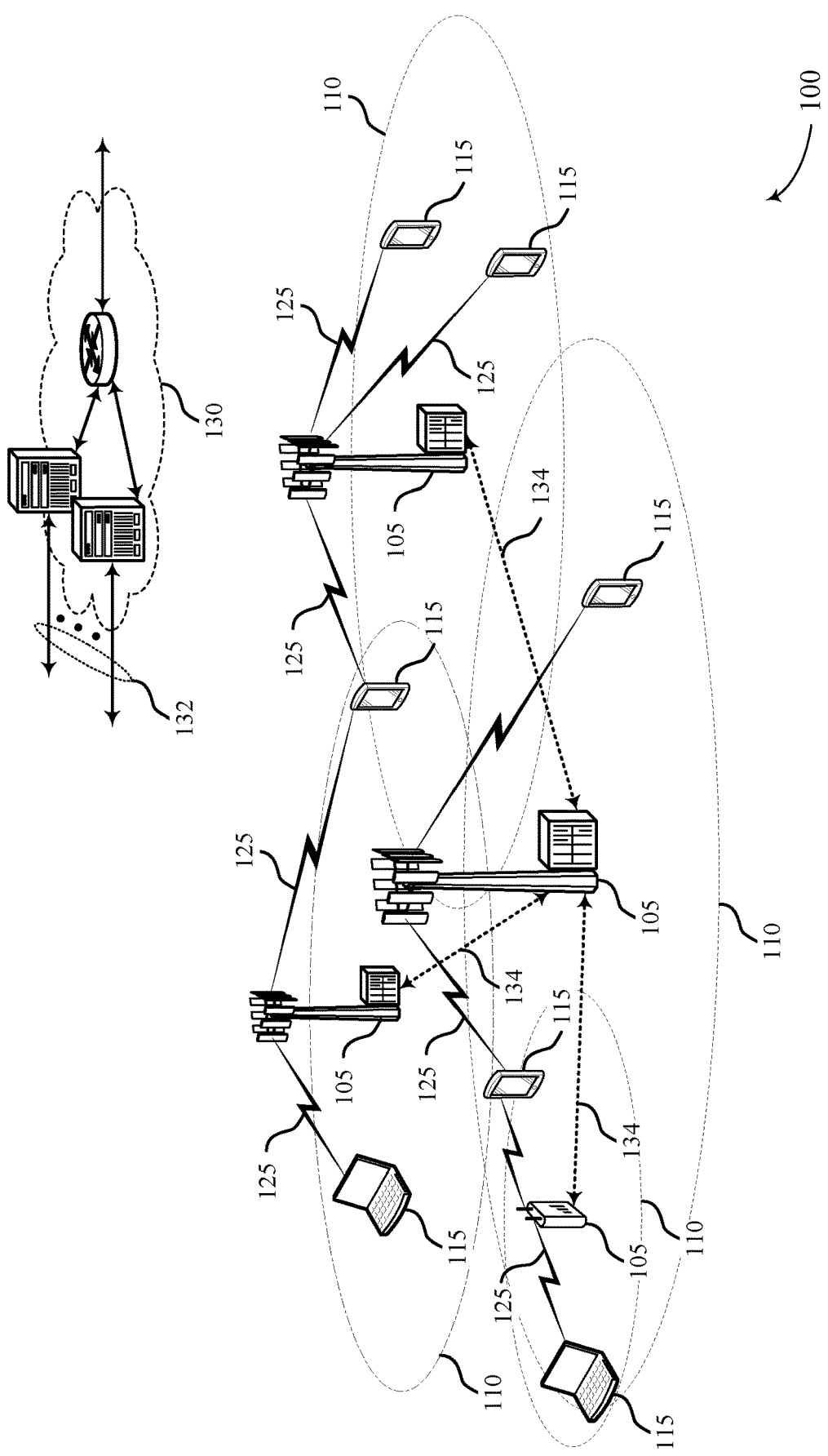
FIG. 1 illustrates an example of a system for wireless communications that supports in-advance scheduling for low latency traffic in accordance with aspects of the present disclosure.

Some wireless communications systems, such as integrated access and backhaul networks (IAB) may support low latency communications or delay-sensitive communications. In some cases, the wireless communications system may support both delay-sensitive traffic, such as ultra-reliable low latency communications (URLLC) in addition to other types of traffic, such as mobile broadband (MBB) or enhanced MBB (eMBB). The delay-sensitive traffic may have stringent latency and reliability requirements. Therefore, the wireless communications system may support techniques for reducing latency. For example, the wireless communications system may support in-advance scheduling for delay sensitive traffic. A downlink control information (DCI) grant used for in-advance scheduling (e.g., to schedule a downlink resource for a delay-sensitive packet) may include routing information for a next hop for the delay-sensitive packet. By including the routing information in the DCI grant, the child node (e.g., receiving the DCI grant) may be able to transmit a DCI grant to the next hop prior to completion of processing the delay-sensitive packet.

An IAB relay node may receive a DCI grant from a parent node. If a routing identifier is included in the DCI grant, the IAB relay node may identify the next hop child node from the routing identifier and determine whether in-advance scheduling is to be used for the transmission to the next hop. If in-advance scheduling is used, the IAB relay node may send a DCI grant for the next hop to the identified child node before the IAB relay node finishes processing the delay-sensitive data packet received from the parent node. If in-advance scheduling is not used, the IAB relay node may send a DCI grant for the next hop to the child node after the data packet is received and processed successfully. The IAB relay node may then transmit the delay-sensitive downlink packet to the child node based on the DCI grant. In some cases, the DCI grant for the next hop may include delay-sensitive routing information (e.g., a routing identifier) regardless of whether the in-advance scheduling is adopted at the IAB relay node, as the in-advance scheduling may be implemented at child nodes or grandchild nodes. Similar techniques are described for uplink communications, where an IAB relay node may transmit a scheduling request prior to finishing processing a delay-sensitive uplink packet.

In some cases, if a cyclic redundancy check (CRC) fails at the IAB relay node for the received data packet, the IAB relay node may send a notification of cancellation to cancel the in-advance scheduling on the next available downlink control channel occasion to the target child node. In some cases, the IAB relay node may provide some feedback information on in-advance scheduling to the parent node, for example as part of acknowledgment (ACK) or negative acknowledgment (NACK) feedback to the parent node. The parent node may use the feedback information for scheduling the next packet for other nodes or for attempting to re-transmit the delay-sensitive traffic.

Aspects of the disclosure are initially described in the context of a wireless communications system. Aspects of the disclosure are further illustrated by and described with reference to apparatus diagrams, system diagrams, and flowcharts that relate to in-advance scheduling for low latency traffic.

FIG. 1 illustrates an example of a wireless communications system 100 that supports in-advance scheduling for low latency traffic in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

An IAB relay node may receive a DCI grant from a parent node. If a routing identifier is included in the DCI grant, the IAB relay node may identify the next hop child node from the routing identifier and determine whether in-advance scheduling is to be used for the transmission to the next hop. If in-advance scheduling is used, the IAB relay node may send a DCI grant for the next hop to the identified child node before the IAB relay node finishes processing the delay-sensitive data packet received from the parent node. The IAB relay node may then transmit the delay-sensitive downlink packet to the child node based on the DCI grant. In some cases, the DCI grant for the next hop may include delay-sensitive routing information (e.g., a routing identifier) regardless of whether the in-advance scheduling is adopted at the IAB relay node, as the in-advance scheduling may be implemented at child nodes or grandchild nodes.

Figure 2:
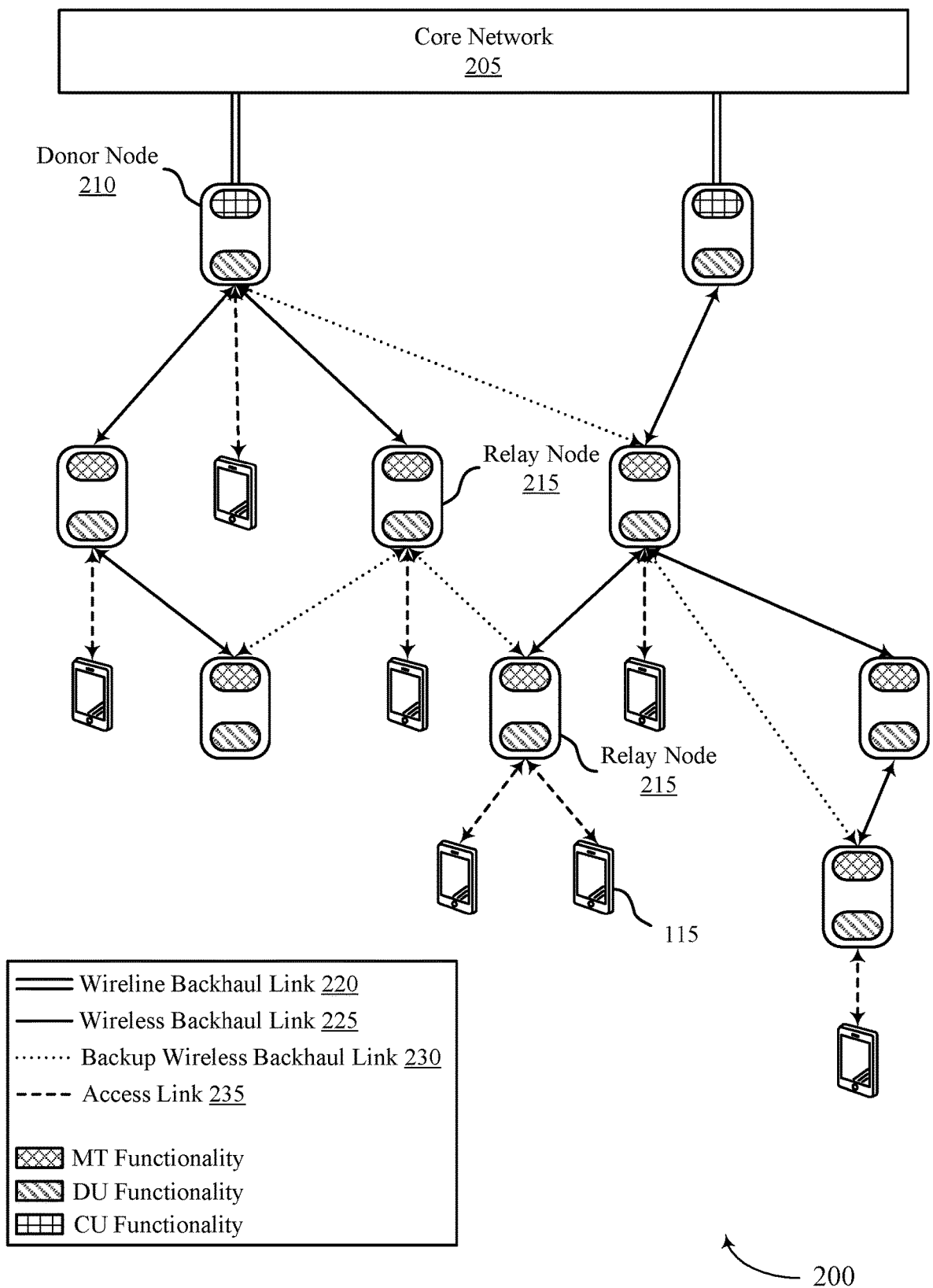
FIGS. 2 through 4 illustrate example of wireless communications systems that support in-advance scheduling for low latency traffic in accordance with aspects of the present disclosure.

FIG. 2 illustrates an example of a wireless communications system 200 that supports advance scheduling for low latency traffic in an IAB in accordance with one or more aspects of the present disclosure. Wireless communications system 200 (e.g., an NR system, a mmW system, etc.) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as IAB nodes, such as IAB donor nodes 210 and IAB relay nodes 215. Wireless communications system 200 may additionally support a number of UEs 115, which may communicate on the uplink with one or more IAB donor nodes 210, IAB relay nodes 215, or a combination of these devices. In some examples, wireless communications system 200 may implement aspects of wireless communications system 100.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links 230, access links 235, etc.). An IAB donor node 210 may be split into associated base station central unit (CU) and distributed unit (DU) entities, where one or more DUs associated with an IAB donor node 210 may be partially controlled by an associated CU. CUs of IAB donor nodes 210 may host layer 3 (L3) (e.g., RRC, service data adaption protocol (SDAP), PDCP, etc.) functionality and signaling. Further, CUs of IAB donor nodes 210 may communicate with the core network 205 over a wireline backhaul link 220 (e.g., which may be referred to as an NG interface). DUs may host lower layer operations, such as layer 1 (L1) or layer 2 (L2) (e.g., RLC, MAC, physical layer, etc.) functionality and signaling. A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child) IAB relay nodes 215 and or UEs 115. For example, a DU may support an RLC channel connection with a UE 115 (e.g., via an access link 235) or with an IAB relay node 215 (e.g., via a backhaul link, such as a primary wireless backhaul link 225 or a backup wireless backhaul link 230).

IAB relay nodes 215 may be split into associated mobile terminal (MT) and base station DU entities, where MT functionality of the IAB relay nodes 215 may be controlled or scheduled by antecedent (i.e., parent) IAB nodes via wireless backhaul links. A parent node to an IAB relay node 215 may be another (antecedent) IAB relay node 215 or a donor node 210. The MT functionality may be similar to functionality performed by UEs 115 in the system. An IAB relay node 215 may not be directly connected to a wireline backhaul 220. Instead, the IAB relay node 215 may connect to the core network 205 via other IAB nodes (e.g., any number of additional IAB relay nodes 215 and an IAB donor node 210) using wireless backhaul links. The IAB relay node 215 may transmit upstream (e.g., towards the core network 205) in the IAB system using MT functionality. In some cases, DUs of the IAB relay nodes 215 may be partially controlled by signaling messages from CU entities of an associated IAB donor node 210 (e.g., transmitted via an F1-application protocol (AP)). The DUs of the IAB relay nodes 215 may support serving cells of the network coverage area. For example, a DU of an IAB relay node 215 may perform the same or similar functions as a DU of an IAB donor node 210, supporting one or more access links 235 for UEs 115, one or more wireless backhaul links for downstream IAB relay nodes 215, or both.

Wireless communications system 200 may employ relay chains for communications within the IAB network architecture. For example, a UE 115 may communicate with an IAB node, and the IAB node may relay the data to a base station CU or the core network 205 either directly or via one or more IAB relay nodes 215. Each IAB relay node 215 may include a primary wireless backhaul link 225 for relaying data upstream or receiving information from a base station CU or the core network 205. In some cases, an IAB relay node 215 may additionally include one or more backup wireless backhaul links 230 (e.g., for redundant connectivity or improved robustness). If the primary wireless backhaul link 225 fails (e.g., due to interference, malfunction at a connected IAB node, movement of IAB nodes, maintenance at IAB nodes, etc.), an IAB relay node 215 may utilize a backup wireless backhaul link 230 for backhaul communication within the IAB network. The first (e.g., primary) wireless backhaul link 225 may be associated with a coverage area and MT functionality may be controlled or scheduled by a first parent node. The one or more secondary backhaul links (e.g., backup wireless backhaul links 230) may be associated with a non-collocated coverage area and controlled or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control or schedule descendant IAB relay nodes 215 and UEs 115 within the IAB network (e.g., downstream in the IAB network) via the configured backhaul and access links. That is, an IAB relay node 215 may act as a relay between an IAB donor node 210 and one or more descendant devices (e.g., other IAB relay nodes 215, UEs 115, etc.) in both communication directions based on established backhaul and access connections.

In some cases, the wireless communications system 200 may support low latency communications or delay-sensitive communications. The wireless communications system 200 may support both delay-sensitive traffic, such as ultra-reliable low latency communications (URLLC) in addition to other types of traffic, such as mobile broadband (MBB) or enhanced MBB (eMBB). The delay-sensitive traffic may have stringent latency and reliability requirements. Therefore, the wireless communications system 200 may support techniques for reducing latency. For example, the wireless communications system 200 may support in-advance scheduling for delay sensitive traffic. A DCI grant used for in-advance scheduling (e.g., to schedule a downlink resource for a delay-sensitive packet) may include routing information for a next hop for the delay-sensitive packet. By including the routing information in the DCI grant, the child node (e.g., receiving the DCI grant) may be able to transmit a DCI grant to the next hop prior to completion of processing the delay-sensitive packet.

In an example, an IAB relay node 215 may receive a DCI grant from its parent node. If a routing identifier is included in the DCI grant, the IAB relay node 215 may identify the next hop child node from the routing identifier and determine whether in-advance scheduling is to be adopted for the transmission to the next hop. If in-advance scheduling is used, the IAB relay node 215 may send a DCI grant for the next hop to the identified child node before the IAB relay node 215 completes the processing of the received data packet from the parent node. If in-advance scheduling is not used at this hop, the IAB relay node 215 may send a DCI grant for the next hop to the child node after the data packet is received and processed successfully by the IAB relay node 215. The IAB relay node 215 may then transmit the delay-sensitive downlink packet to the child node based on the DCI grant. In some cases, the DCI grant for the next hop may include delay-sensitive routing information (e.g., a routing identifier) regardless of whether the in-advance scheduling is adopted at the IAB relay node 215, as the in-advance scheduling may be implemented at child nodes or grandchild nodes.

If the CRC fails at the IAB relay node 215 for the received data packet, the IAB relay node 215 may send a notification of cancellation to cancel the in-advance scheduling on the next available downlink control channel occasion to the target child node. The MT of the IAB relay node 215 may provide some feedback information on in-advance scheduling to the parent node, for example as part of HARQ feedback (e.g., ACK/NACK feedback) to the parent node. The parent node may use the feedback information for scheduling the next packet for other nodes or for attempting to re-transmit the delay-sensitive traffic.

In some cases, a backhaul access protocol (BAP) routing identifier may be used in some IAB networks for routing functions in the BAP layer. The BAP routing identifier may include a BAP address of a destination IAB-node and a BAP path identifier. A routing identifier, as described herein, may refer to a unique identifier in downlink control information that identifies the next-hop node for a low-latency packet. In some cases, the routing identifier described herein may point to an index in a table configured by RRC or a MAC CE, the table containing a subset of end-to-end routs in the network that are associated with low-latency traffic. In some cases, an end-to-end route configured in the table may be represented by a BAP routing identifier and an identifier of the access UE at the serving IAB node.

In some cases, a downlink control information grant described herein may include multiple routing identifiers. More than one routing identifier may be included in the downlink control grant, such as if a data packet scheduled by the downlink control information grant includes multiple sub-packets for different end UEs 115. For example, the different end UEs 115 may share some common intermediate IAB nodes at the beginning of the route, but later may diverge into different paths to reach the end UEs 115. In this example, each route identifier in the grant may correspond to the route of one subpacket for an end UE 115. In some cases, the size of each subpacket may also be included in the DCI grant. In some cases, as data packets travel in the network, the data packet may split into different sub-packets when the routes diverge from each other. Information for sizes of sub-packets may be used when sending in-advance downlink control information for different sub-packets.

Figure 3:
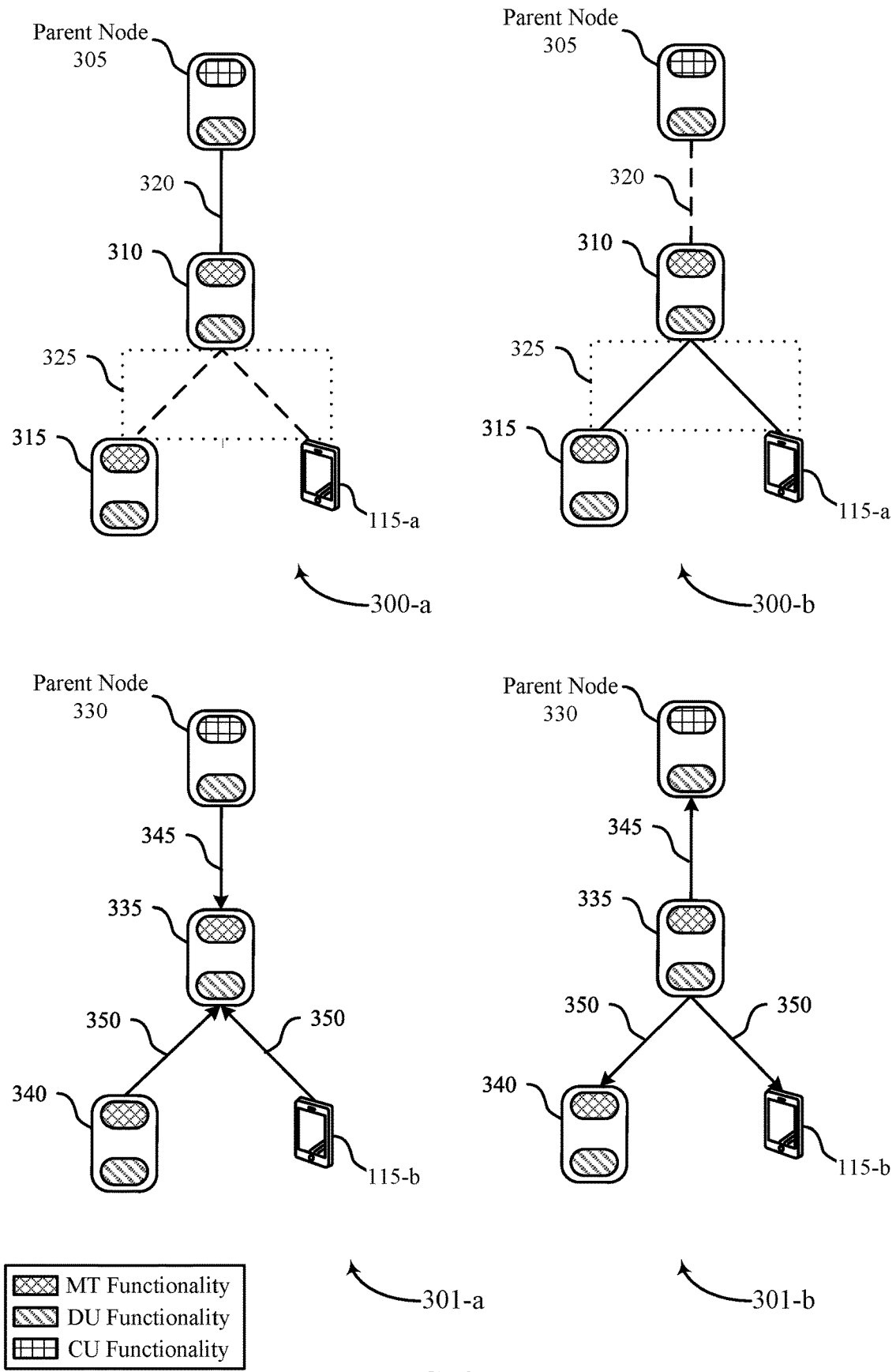

FIG. 3 illustrates examples of wireless communications systems 300 and 301 that support in-advance scheduling for low latency traffic in accordance with aspects of the present disclosure. In some examples, the wireless communications systems 300 and 301 may implement aspects of wireless communication system 100.

The wireless communications systems 300 and 301 may support half-duplex communications. According to half-duplex communications, an IAB node may be capable of bi-directional communication, including uplink transmission (e.g., to a parent IAB node or from a child IAB node) and downlink transmissions (e.g., from a parent IAB node or to a child IAB node), but the IAB node may not support simultaneous bi-directional transmission. For example, the IAB node may either transmit to the parent IAB node or receive a transmission from the IAB node, but the IAB node may not support both transmitting to and receiving from the parent IAB node simultaneously.

An IAB network may implement different techniques for half-duplex communications, examples of which may be shown by the wireless communications systems 300 and 301. For example, the wireless communications system 300 may describe TDM communications based on a half-duplex constraint, and the wireless communications system 301 may describe FDM communications or spatial division multiplexing (SDM) communications based on the half-duplex constraint. IN some cases, a node may transmit or receive information according to a frame structure configured for a number of slots. In some examples, each slot may be configured by an SFI, which may include a configuration of uplink and downlink transmission or reception opportunities within the slot.

The wireless communications system 300 may include an IAB donor node 305 (e.g., a parent node), which may be example of a donor node 210 as described above with reference to FIG. 2. The IAB donor node 305 may be split into associated base station CU and DU entities, where the DU of IAB donor node 305 may be partially controlled by the associated CU. Wireless communications system 300 may include IAB relay node 310 and IAB relay node 315 (e.g., child nodes), which may be examples of a IAB relay node 215 as described above with reference to FIG. 2. The wireless communications system 300 may also include UE 115-a, which may be an example of a UE 115 described herein. IAB relay nodes 310 and 315 may be split into associated MT and base station DU entities, where MT functionality of the IAB relay nodes 310 and 315 may be controlled or scheduled by antecedent (e.g., donor) IAB nodes via wireless backhaul links.

The wireless communications system 300 may support TDM-based resource management techniques based on a half-duplex constraint. For example, the IAB node 310 may communicate on either a parent link 320 with the parent node 305 or on child links 325 with child nodes (e.g., the IAB node 315, UE 115-a, or both). According to the TDM-based resource management techniques, the IAB node 310 may not support simultaneous communications on both the parent link 320 and the child links 325. In some cases, the IAB node 310 may support TDM communications on the child links 325 and the parent link 320. In some cases, the TDM-based resource management techniques may be synchronized.

In an example, for a first period of time (e.g., TTIs such as slots, mini-slots, subframes, frames, etc.) corresponding to wireless communications system 300-a, the IAB node 310 may communicate with the parent node 305 over the parent link 320, and the IAB node 310 may not communicate with the child nodes 325. During the first period of time, the IAB node 310 may transmit to (e.g., for uplink transmission) or receive from (e.g., for downlink reception) the parent node 305 on the parent link 320. During a second period of time (e.g., subsequent to the first period of time) corresponding to wireless communications system 301-*b*, the IAB node 310 may communicate with the IAB node 315, UE 115-*a*, or both, on one or more of the child links 325. The IAB node 310 may not communicate with the parent node 305 during the second period of time.

The wireless communications system 301 may support FDM-based resource management or SDM-based resource management based on a half-duplex constraint. The wireless communications system 301 may include an IAB node 335 (e.g., a relay IAB node), a parent node 330 (e.g., a parent node to the IAB node 335), an IAB node 340 (e.g., a child node of the IAB node 340), and UE 115-*b*, which may also be a child of IAB node 335. In some cases, the parent node 330 may be an example of a donor node, or the parent node 330 may be an example of a relay IAB node.

According to the FDM-based resource management or SDM-based resource management, IAB relay nodes may support either transmitting or receiving data from different nodes during the same time period. An IAB relay node may either be in a receive (RX) mode or a transmit (TX) mode. For example, during a first time period corresponding to wireless communications system 301-*a*, IAB node 335 may receive a transmission from a parent node 330 on a parent link 345 and, in the same period of time, receive transmissions from one or more child nodes (e.g., IAB node 340 or UE 115-*c*) on child links 350. In this example, the IAB node 335 may operate in the RX mode. The transmissions on the parent link 345 and the transmissions on the child links may, in some cases, be transmitted on different frequency bands. Or, in some examples, wireless communications system 301-*a* may support simultaneous transmission on the child links 325 and the parent links 320 due to the spatial differences. During another time period corresponding to wireless communications system 301-*b*, IAB node 335 may support simultaneous transmission on the parent link 345 to the parent node 330 and transmission one or more of the child links 350 to IAB node 340, UE 115-*b*, or both. In this example, IAB node 335 may operate in the Tx mode.

Figure 4:
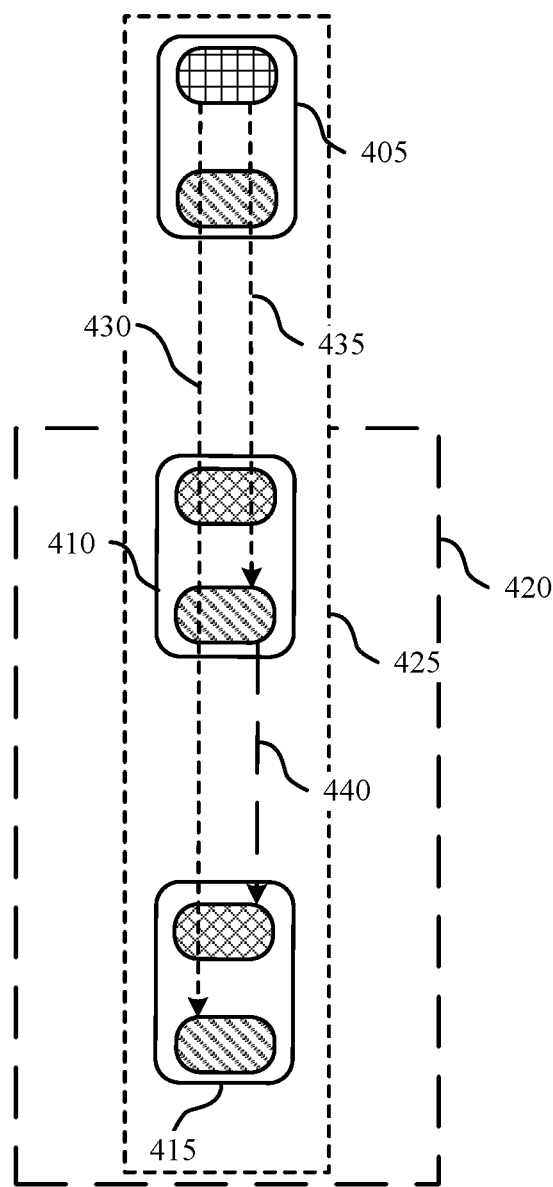

FIG. 4 illustrates an example of a wireless communications system 400 that supports in-advance scheduling for low latency traffic in accordance with aspects of the present disclosure. In some examples, the wireless communications system 400 may implement aspects of wireless communication system 100.

Wireless communications system 400 may include an IAB donor node 405, which may be an example of a donor node 210 as described with reference to FIG. 2. IAB donor node 405 may be split into associated base station CU and DU entities, where one or more DUs associated with IAB donor node 405 may be partially controlled by an associated CU. Wireless communications system 400 may include IAB relay node 410 and IAB relay node 415, which may each be an example of an IAB relay node 215 as described with reference to FIG. 2. IAB relay nodes 410 and 415 may be split into associated MT and base station DU entities, where MT functionality of the IAB relay nodes 410 and 415 may be controlled or scheduled by antecedent (e.g., donor) IAB nodes via wireless backhaul links.

An IAB resource management framework may determine how resources are assigned, configured, or used in the wireless communications system 400. The behavior of an IAB node, such as how a DU of the IAB node determines whether a resource is available, may be based on a type of the resource. The DU may assume that hard resources can be used regardless of the MT's configuration. For example, despite signaling to or configurations of the MT of the IAB node, the DU of the IAB node may determine that hard resources are available for use. In some cases, the DU may determine that a resource is not available, and that the DU cannot use the not available resources. For not available resource types, the DU may assume it cannot use the resource based on the MT having priority of the resource. For a soft resource, the DU may first determine whether there has been signaling indicating whether the soft resource is available. If the soft resource has been indicated as available (e.g., explicitly or implicitly), the IAB node may consider the soft resource as a hard resource. If the soft resource has not been indicated as available, the IAB node may consider the soft resource as not available.

An MT of an IAB relay node may be configured for downlink resources, uplink resources, or flexible resources. Flexible resources may be configured as either uplink resources or downlink resources. In some cases, a flexible resource may be explicitly indicated as an uplink or downlink resource, or the MT may determine the direction. A DU of an IAB relay node may be configured for hard downlink, uplink, or flexible resources, soft downlink, uplink, or flexible resources, and not available resources.

An IAB resource management framework may include a Uu interface 420 and an F1 application protocol (AP) interface 425 and a Uu interface 420. The F1-AP interface 425 may be between the CU of the IAB donor node 405 and DUs of the IAB relay nodes 410 and 415. The Uu interface 420 may be between a DU of a parent IAB node and an MT of a child IAB node.

The IAB resource management framework may include semi-static configuration of resource patterns by the CU. The IAB resource management framework may also support a parent node having dynamic control of soft resources for child DUs. The dynamic control soft resources may be signaled via an explicit indication or implicit indication. For the explicit signaling, the parent node may send an indication (e.g., similar to DCI conveying an SFI) to the child node of which soft resource the child DU is to use. For implicit signaling, the child node DU may use a soft resource if the usage will not impact the MT's ability to transmit or receive according to its configuration and scheduling. In some cases, the child node DU may determine whether using the soft resource would impact the MT's communications.

In some examples, the DUs of the IAB relay nodes 410 and 415 may be partially controlled by signaling from the CU of the IAB donor node 405. For example, the DU of the IAB relay node 410 may be partially controlled by the F1-AP signaling 435, and the DU of the IAB relay node 415 may be partially controlled by the F1-AP signaling 430. The F1-AP signaling 430 and 435 may be transmitted via the F1-AP interface 425. Signaling over the F1-AP interface 425 may configure the DUs of IAB relay nodes 410 and 415 and be used to transmit RRC messages for MTs of IAB relay nodes 410 and 415. In some cases, the F1-AP signaling 430 and 435 may be used to semi-statically configure resource patterns for the DUs of the IAB relay nodes 410 and 415.

In some examples, the MT of an IAB relay node (e.g., the IAB relay node 415) may be partially controlled by signaling transmitted over the Uu interface 420. For example, the MT of the IAB relay node 415 may be controlled by the DU of the IAB relay node 410 via Uu signaling 440. The Uu interface 420 may transfer RRC configurations of the CU to the MT of the IAB relay node 415. The Uu interface 420 may be used to dynamically schedule the MT of IAB relay node 415 and dynamically control DU assignment of soft resources for the IAB relay node 415. The signaling over the Uu interface 420 may be an example of the dynamic control of soft resources for a DU via the parent node of the DU. For example, the Uu signaling 440 may transmit an explicit or implicit indication of whether a soft resource is available for the DU of the IAB relay node 415. As described herein, an example of an explicit indication may include an SFI or another signal which conveys slot format information. An example of an implicit indication may be that the child DU uses a soft resource only if the child DU can determine that usage of the soft resource would not affect the MT's ability to communicate according to its configuration and scheduling.

Figure 5:
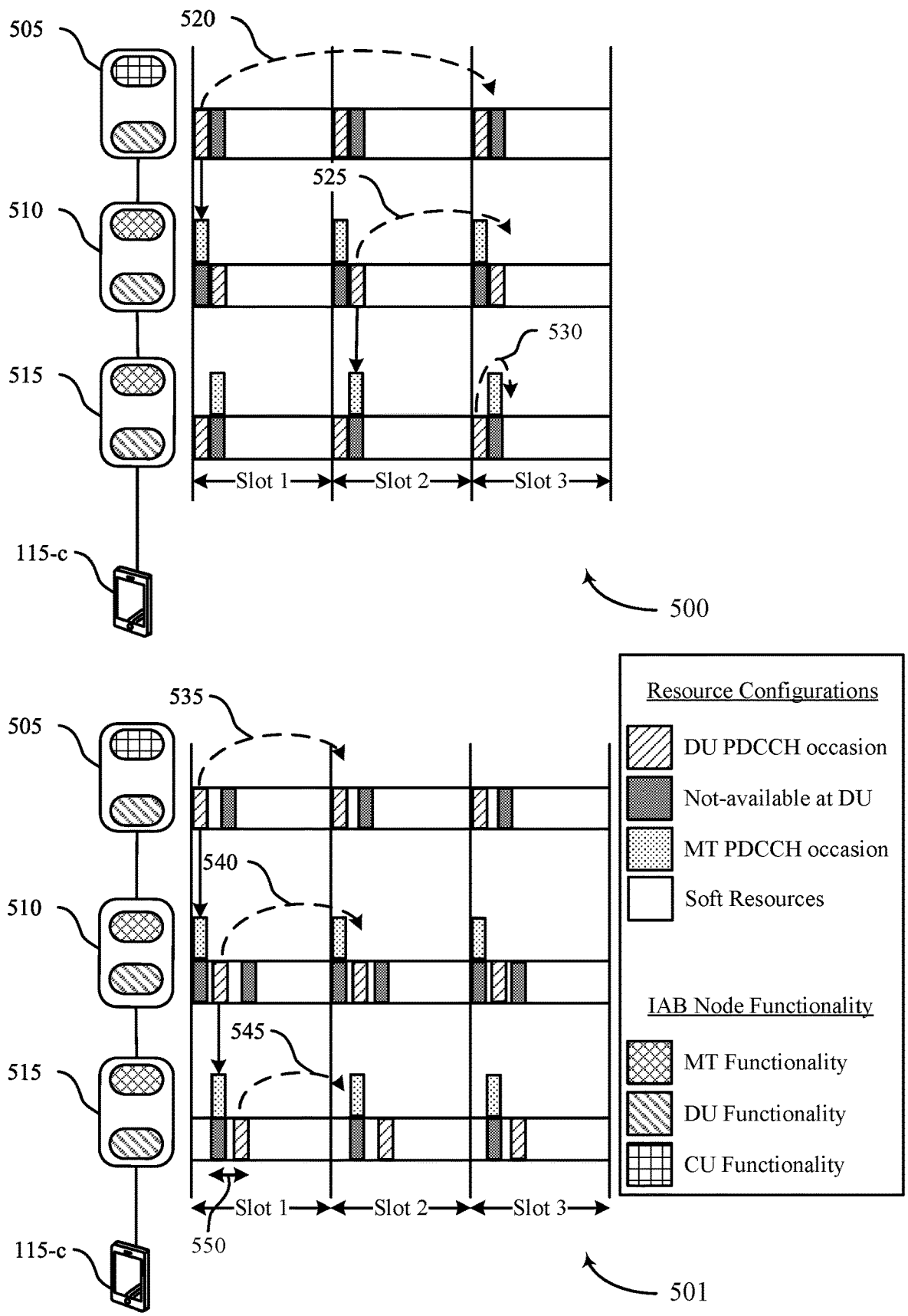
FIG. 5 illustrates examples of implicit soft resource indications that support in-advance scheduling for low latency traffic in accordance with aspects of the present disclosure.

FIG. 5 illustrates examples of implicit soft resource indications 500 and 501 that support in-advance scheduling for low latency traffic in accordance with aspects of the present disclosure. In some examples, the implicit soft resource indications 500 and 501 may implement aspects of wireless communication system 100.

The implicit soft resource indications 500 and 501 may include an IAB donor node 505, which may be an example of a donor node 210 as described above with reference to FIG. 2. The implicit soft resource indications 500 and 501 may also include IAB relay nodes 510, 515, and UE 115-c, which may each be an example of an IAB relay node 215 as described above with reference to FIG. 2. The IAB relay nodes 510 and 515 may be split into associated MT and base station DU entities, where MT functionality of the IAB relay nodes 510 and 515 may be controlled or scheduled by antecedent (e.g., donor or parent) IAB nodes via wireless backhaul links.

As described by the wireless communications system 400 with reference to FIG. 4, a DU of an IAB relay node may be configured with soft resources. A parent node of the IAB relay node may dynamically control the soft resources for the DU of the IAB relay node. In some cases, the parent node may explicitly indicate whether the soft resources are available for the DU of the IAB relay node (e.g., via an SFI or another signal indicating the slot format configuration). Additionally, or alternatively, the DU of the IAB relay node may determine whether the soft resources are available based on an implicit indication. For example, if the DU of the IAB relay node determines that using the soft resources would not impact the MT's ability to communicate based on a configuration of the MT and scheduling information of the MT, the DU of the IAB relay node may implicitly determine that the soft resources are available.

The implicit signaling techniques may be supported based on a scheduling gap, or scheduling offset, between a PDCCH occasion carrying a DCI grant and the PSDCH transmission. The scheduling gap may include a number of slots. The number of slots may be configurable (e.g., by the donor node 505 or another network node) or may be configured for the wireless communications system. The scheduling gap may give the IAB relay nodes time to determine whether a soft resource can be used without affecting communications of other functionalities. An IAB node may have time to identify or figure out the communication configurations and scheduling of the parent node and determine whether the DU of the IAB node can use a soft resource or not.

The scheduling gap may correspond to a value, K0. If, for example K0=0, then the DCI grant and the PDSCH occasion scheduled by the DCI grant may be within a single slot duration. If K0=1, then the PDSCH occasion may be separated from the DCI grant by at least a single slot (e.g., by being scheduled in a subsequent slot). The value of K0 may correspond to the scheduling gap as a number of slots between the DCI grant and a PDSCH occasion scheduled by the DCI grant. In some cases, different IAB nodes may have different K0 values.

The implicit soft resource indication 500 may be based on a wireless communications system where downlink control channel occasions (e.g., PDCCH occasions) occur only at the beginning of a slot. At 520, the IAB donor node 505 may transmit a DCI grant with a configuration gap K0 equal to 2. Therefore, the DCI grant transmitted in slot 1 may schedule PDSCH resources in the soft resources of slot 3. The DU of the IAB donor node 505 may transmit the DCI grant to the MT of the IAB relay node 510. Therefore, the MT of the IAB relay node 510 may have an MT PDCCH occasion at the same time as the DU PDCCH occasion of the DU of the donor node 505. In some cases, a scheme where PDCCH occasions can only occur at the beginning of a slot may reduce overhead signaling for implicit indications of soft resources.

Based on receiving the DCI grant at 520 with K0=2, the IAB node 510 may have time to determine whether the soft resources of slot 2, slot 3, or both, are available. For example, the DCI grant received at 520 may, at the earliest, schedule resources for slot 3 based on the scheduling gap. So, if there are no scheduling decisions made for slot 2, the DU at the IAB relay node 510 may determine that using the soft resources of slot 2 would not affect communications at the MT of the IAB relay node 510. Further, the DCI grant at 520 may include scheduling information for slot 3, so the DU of the IAB relay node 510 may also be able to determine whether soft resources for slot 3 can be treated as hard resources or not available. The DU of the IAB relay node 510 may then treat the soft resources of slot 2 as hard resource based on the determination, and the DU of the IAB relay node 510 may be able to use the soft resources of slot 2.

At 525, based on determining that the soft resources of slot 2 and slot 3 can be used, the DU of the IAB relay node 510 may transmit a DCI grant scheduling soft resources of slot 3 for the MT of the IAB relay node 515. The DU of the IAB relay node 510 may have a scheduling gap K0 of 1. Thus, the DCI grant at 525 may be separated from the scheduled PDSCH occasion in the soft resources of slot 3 by one slot. This may give the DU of the IAB relay node 510 time to determine whether soft resources of slot 3 are available, and whether the DU of the IAB relay node 510 can use soft resources of slot 3 without affecting communications at its associated MT. The DU of the IAB relay node 510 may then transmit a DCI grant to UE 115-c at 530 to schedule soft resources in slot 3 for UE 115-c. In some cases, each IAB node (e.g., the IAB donor node 505 and the IAB relay nodes 510 and 515) may each be able to schedule their child node for soft resources in slot 3 based on the different nodes having different scheduling gaps. The different scheduling gaps may provide that that each IAB node can determine whether soft resources for slot 3 are available or not based on scheduling information for the MTs.

The implicit soft resource indication 500 be based on a wireless communications system where downlink control channel occasions (e.g., PDCCH occasions) can occur in any symbol of a slot. In some cases, A DU of an IAB node may make similar determinations of whether soft resources are available for use (e.g., can be treated as hard resources) based on scheduling information for an associated MT of the IAB node.

For example, at 535, the IAB donor node 535 may transmit a DCI grant to the MT of the IAB node 510 scheduling soft resources for an MT of the IAB node 510 in slot 2 (e.g., with a scheduling gap value K0 of 1). Upon receipt of the DCI grant at 535 (e.g., after a PDCCH processing time 540), the DU of the IAB node 510 may determine whether the DU using soft resources in slot 2 would affect communications of the MT of the IAB node 510. If the DU of the IAB node 510 implicitly determines that the soft resources are available, the DU of the IAB node 510 may transmit a DCI grant to the MT of the IAB node 515 at 540. Based on receiving the DCI grant at 540, the DU of the IAB node 515 may implicitly determine whether soft resources of slot 2 are available and can be used without affecting communications at the associated MT. Once an MT processes a DCI grant, the time of which may correspond to the PDCCH processing time 540, the DU may be able to determine whether the DU can use resources in a slot scheduled by the DCI grant without affecting communications at the MT.

Figure 6:
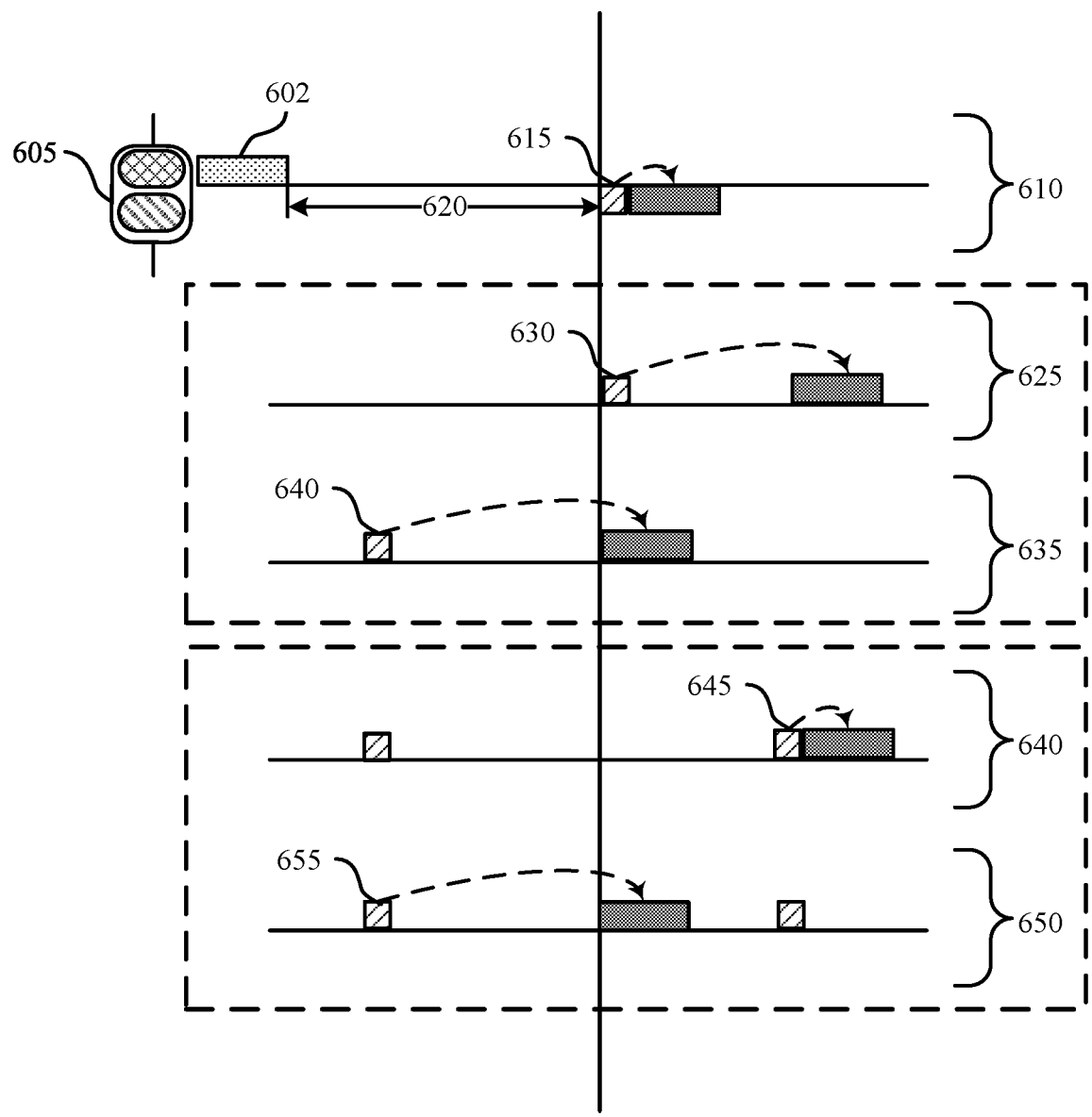
FIG. 6 illustrates an example of a scheduling timeline that supports in-advance scheduling for low latency traffic in accordance with aspects of the present disclosure.

FIG. 6 illustrates an example of a scheduling timeline 600 that supports in-advance scheduling for low latency traffic in accordance with aspects of the present disclosure. In some examples, the scheduling timeline 600 may implement aspects of wireless communication system 100.

The scheduling timeline 600 may include an IAB relay node 605, which may be an example of an IAB relay node 215 as described above with reference to FIG. 2. The IAB relay node 605 may be split into associated MT and base station DU entities, where MT functionality of the IAB relay node 605 may be controlled or scheduled by antecedent (e.g., donor or parent) IAB nodes via wireless backhaul links.

In some cases, the IAB node 605 may be an intermediary relay node for a data packet received at the MT of the IAB node 605. For example, the IAB node 605 may receive the data packet at the MT and process the data packet. Then, the DU may be configured to transmit the data packet, forwarding the data packet to another hop in an IAB network by transmitting the data packet to an MT of a child node.

In some cases, the IAB node 605 may support low latency communications. For example, the IAB node 605 may support a low latency communications scheme such as URLLC as well as MBB communications. Therefore, to meet stringent latency and reliability requirements of some low latency communications schemes, the IAB node 605 may be configured to transmit (e.g., forward to a child node) the data packet to the child node at an earliest occasion. However, the MT of the IAB node 605 may first receive the packet, then the IAB node 605 may process the data packet, then the DU of the IAB node 605 may transmit DCI carrying a downlink grant to schedule resources to transmit the data packet to the child node.

A first example is shown by an ideal conventional case 610. In some cases, the ideal conventional case 610 may be an example of an ideal case for a conventional system. At 602, a downlink data packet may be received at the MT of the IAB node 605. The IAB node 605 may begin processing the downlink data packet. Processing the packet may take a processing time 620. For example, it may take at least the duration of the processing time 620 for the IAB node 605 to decode the downlink data packet, process the L2 contents of the downlink data packet, and encode the downlink data packet for the next hop (e.g., a child node of the IAB node 605).

In some cases of the conventional system, the IAB node 605 may identify the next hop for the downlink data packet based on processing the downlink data packet. For example, the IAB node 605 may identify a routing table based on processing L2 information of the downlink data packet, and the next hop may be identified from the routing table. Therefore, a conventional system processes the L2 information of the downlink data packet to identify the next hop.

Once the IAB node 605 processes the downlink data packet (e.g., after the processing time 620, the IAB node 605 may be able to send the data packet to the next hop. In some conventional systems, the IAB node 605 may process the downlink data packet then transmit DCI carrying a downlink grant to the MT of the next hop. The downlink grant may schedule downlink resources for the DU of the IAB node 605 to transmit the downlink data packet to the MT of the next hop.

In the ideal conventional case 610, there may be a PDCCH occasion immediately after the processing time 620, so that the DU of the IAB node 605 can transmit the downlink grant right when the IAB node 605 finishes processing the downlink data packet. In the idea conventional case 610, the DU of the IAB node 605 may also be able to schedule downlink resources with a scheduling gap of K0=0. With a scheduling gap of 0, the IAB node 605 may transmit the downlink data packet to the next hop within the same slot (e.g., immediately after the PDCCH occasion used to transmit DCI carrying the downlink grant).

However, there may be constraints placed on the IAB node 605 or the wireless communications system such that the IAB node 605 cannot meet the ideal conventional case 610. In some cases, these constraints or conditions may prevent the IAB node 605 from transmitting the DCI grant at right after the processing time 620 of the downlink data packet. Therefore, in some cases, the downlink data packet may be transmitted with some delay. This may cause issues for low latency communications schemes with stringent reliability and latency requirements.

In one example, at 625, the IAB node 605 may have a scheduling gap constraint of K0>0. For example, the IAB node 605 may not be capable of, or may be configured not to, transmit the downlink data packet within the same slot as the downlink grant. In some cases, the IAB node 605 may have a scheduling gap which is greater than 0 based on implicit control of soft resources (e.g., as described with reference to FIG. 5). However, the increased scheduling gap may lead to delay in transmitting the downlink data packet. At 625, the IAB node 605 may have a PDCCH occasion right after the processing time 620 and transmit DCI at 630, but the IAB node 605 may schedule the downlink resources for the next slot based on the scheduling gap. Thus, the IAB node 605 may support, at the earliest, transmitting the downlink data packet in the following slot.

In another example, at 640, the IAB node 605 may complete processing the downlink data packet in between two PDCCH occasions. For example, the next available PDCCH occasion may not follow immediately after the processing time 620. Thus, the IAB node 605 may wait for the next PDCCH occasion to transmit the DCI grant at 645. This may also be an example with increased delay from the ideal conventional case 615, as the IAB node 605 may wait until the next PDCCH occasion to transmit the downlink grant instead of being able to transmit the downlink grant right after the processing time 620. In some cases, aspects from the example at 625, aspects from the example at 640, or aspects from both, may occur which may cause delay for transmitting the downlink data packet to the next hop.

To reduce delay for transmitting a downlink data packet to the next hop, IAB nodes described herein may implement techniques to support in-advance scheduling. In some cases, in-advance scheduling techniques may be applied for delay-sensitive traffic. The in-advance scheduling techniques may enable the delay-sensitive traffic to have improved latency and reliability for low latency communications schemes. In some cases, the in-advance scheduling techniques may be applied for just delay-sensitive packets, which may be indicated based on an identifier of the delay-sensitive packets. For example, the delay-sensitive packets may have a bit value set in a header or other field. Or, in some cases, the IAB node 605 may make a determination based on other criteria (e.g., alternatively or in addition to the delay-sensitivity of a packet) for applying the in-advance scheduling techniques.

In some cases, in-advance scheduling may support sending a DCI grant to the next hop prior to completion of processing the received downlink data packet. For example, the IAB node 605 may transmit a downlink grant to the DU of the next hop prior to the end of the processing time 620. As described in the examples at 625 and 640, sending the DCI grant after completion of processing the received packet may greatly increase latency for the downlink data packet. However, in conventional techniques, the routing information of the downlink data packet may be included in L2 information, which is determined based on processing the downlink data packet. Instead, the techniques described herein may support including routing information in higher layer signaling, such as by including the routing information in DCI carrying a downlink grant. An IAB node, which may be an intermediary node for the downlink data packet, may then process the routing information for the downlink data packet faster and transmit a downlink grant to the next hop prior to completion of processing the downlink data packet.

In an improved example at 635, which has the same constraints as the example at 625 but implements in-advance scheduling, the IAB node 605 may transmit a downlink grant at 640 while still processing the downlink data packet received at 602. For example, the DU of the IAB node 605 may transmit the downlink grant in an earlier slot. This way, the DU of the IAB node 605 may meet the constraint of K0>0, but the DU of the IAB node 605 also transmits the downlink data packet to the next hop closer to the end of the processing time 620. In an example, K0=1, and the DU of the IAB node 605 may transmit the downlink grant in a PDCCH occasion which is in the slot before the end of the processing time 620 (e.g., so the scheduling gap is one slot).

Another example is shown at 650, which has the same PDCCH occasion configurations as the example at 640 but implements in-advance scheduling. The IAB node 605 may transmit a downlink grant at 655 during a PDCCH occasion which occurs while the IAB node 605 is still processing the downlink data packet (e.g., before the end of the processing time 620). This way, the IAB node 605 may not have to wait for the following PDCCH occasion (e.g., as done at 640), which may increase delay for transmitting the delay-sensitive packet to the next hop. Instead, the IAB node 605 may schedule a downlink resource closer to the end of the processing time 620.

In some cases, values for K0 and K2 may be based on a parameter such as a minimum applicable scheduling offset. In some cases, the minimum applicable scheduling offset may be indicated via DCI and correspond to a minimum value restriction for K0 or K2. In some cases, the techniques described herein may be implemented based on the minimum applicable scheduling offset. For example, if an IAB node is configured with the minimum applicable scheduling offset, the IAB node may implement some further enhanced techniques. For example, the IAB node may determine whether a soft resource can be used based on the minimum applicable scheduling offset. In some cases, an IAB node may schedule a delay-sensitive packet based on the minimum applicable scheduling offset. In some cases, a minimum scheduling offset configuration may be toggled. If the minimum scheduling offset configuration is toggled (e.g., a bit in the corresponding bit field is set to '1'), then the IAB node uses configured minimum values for K0 and K2. If the minimum scheduling offset configuration is not toggled (e.g., bit in the corresponding bit field is set to '0'), the IAB node may use different, or secondary, values indicated by the minimum scheduling offset configuration or other scheduling offsets configured for K0 and K2.

Figure 7:
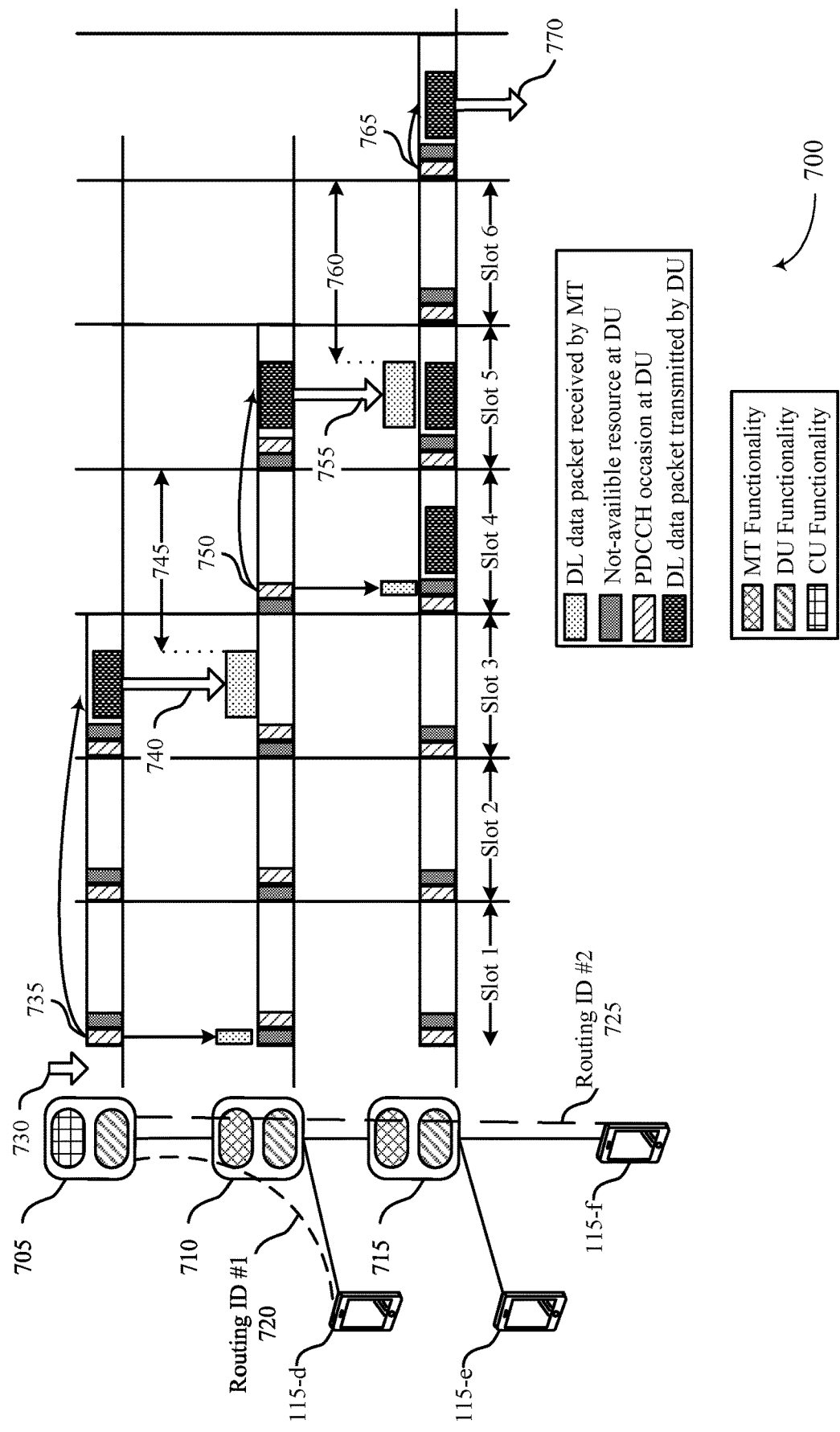
FIGS. 7 and 8 illustrate examples of in-advance scheduling configurations that support in-advance scheduling for low latency traffic in accordance with aspects of the present disclosure.

FIG. 7 illustrates an example of an in-advance scheduling configuration 700 that supports in-advance scheduling for low latency traffic in accordance with aspects of the present disclosure. In some examples, the in-advance scheduling configuration 700 may implement aspects of wireless communication system 100.

The in-advance scheduling configuration 700 may include an IAB donor node 705, which may be an example of a donor node 210 as described with reference to FIG. 2. The IAB donor node 705 may be split into associated base station CU and DU entities, where one or more DUs associated with IAB donor node 705 may be partially controlled by an associated CU. The in-advance scheduling configuration 700 may include an IAB relay node 710 and an IAB relay node 715, which may each be an example of an IAB relay node 215 as described with reference to FIG. 2. IAB relay nodes 710 and 715 may be split into associated MT and base station DU entities, where MT functionality of the IAB relay nodes 710 and 715 may be controlled or scheduled by antecedent (e.g., donor) IAB nodes via wireless backhaul links.

The in-advance scheduling configuration 700 may support techniques for in-advance scheduling described herein. For example, an IAB relay node may be a hop for transmitting a delay-sensitive packet. The IAB relay node may receive the delay-sensitive packet and be configured to transmit the delay-sensitive packet to the next hop (e.g., a child node of the IAB relay node). The in-advance scheduling techniques may support for the IAB relay node to transmit a DCI grant to the next hop before completion of processing the received delay-sensitive packet.

The in-advance scheduling techniques may implement an enhanced downlink grant. A DCI grant described herein may be enhanced with a new field (e.g., an optional new field), such as a routing identifier for a delay-sensitive packet. By including the routing identifier for the delay-sensitive packet, the routing information for the delay-sensitive packet may be conveyed by L1 signaling. In some cases, the routing information may be conveyed by L1 signaling (e.g., DCI via PDCCH) instead of L2 signaling as done by conventional techniques. In some cases, the presence, or certain value(s), of the field for delay-sensitive traffic may indicate that the DCI supports in-advanced scheduling.

The routing identifier indicated in L1 signaling may point to one or more entries in a routing table, from which the IAB node can identify, or select, the target child node that the scheduled packet should be forwarded to for the next hop. In some cases, a separate routing table may be used specifically for in-advance scheduling for delay-sensitive data. The routing table for delay-sensitive data may be established previously at each IAB node, for example during a data bearer setup phase.

In some cases, the routing table for delay-sensitive traffic may be smaller (e.g., have fewer entries) than the routing table used for general, or non-delay-sensitive, traffic. For example, in some examples, only one delay-sensitive bearer may pass through an IAB node which serves a number of UEs and child IAB nodes. In this example, there may only be one entry in the routing table for delay-sensitive traffic, so the enhanced DCI grant may only use one bit to indicate whether the DCI can be associated with in-advanced scheduling.

A routing table for delay-sensitive traffic in the in-advance scheduling configuration 700 may include two different routing paths. For example, a first routing identifier 720 may direct delay-sensitive traffic to UE 115-*d* through IAB relay node 710. A second routing identifier 725 may direct delay-sensitive traffic to UE 115-*f* through IAB relay nodes 710 and 715. In other examples, there may be additional routing identifiers in the routing table, which may direct transmission of a delay-sensitive packet to another wireless device. In some examples, the two routing paths may correspond to delay-sensitive, or low latency, bearers established between the devices configured along the routing path.

In an example, the routing table at IAB donor node 705 may include two values. A first value, corresponding to the first routing identifier 720, may identify the IAB relay node 710 as the next hop. A second value, corresponding to the second routing identifier 725, may also identify the IAB relay node 710 as the next hop. The routing table at IAB donor node 705 may also include two values for the two different routing identifiers. A first value, corresponding to the first routing identifier 720, may identify UE 115-*e* as the next hop. A second value, corresponding to the second routing identifier 725, may identify the IAB relay node 715 as the next hop. In some cases, the routing table at the IAB relay node 715 may only include one value, which may correspond to the second routing identifier 725 and UE 115-*f* as the next hop. Therefore, delay-sensitive routing information for the IAB relay node 715 may only be one bit.

The in-advance scheduling configuration 700 may be an example of a configuration which uses a scheduling gap that is greater than 0. For example, K0>0, such that a DCI grant does not schedule a PDSCH occasion within the same slot. For example, if K0=1, the DCI grant may schedule downlink resources in a following slot. Or, if K0=2, the DCI grant may schedule downlink resources two slots later (e.g., the DCI grant is transmitted in slot 0 to schedule resources in slot 2). In some cases, a scheduling gap may be used to support implicit control of soft resources as described with reference to FIG. 5.

In an example, at 730, the IAB donor node 705 may receive a delay-sensitive packet with the second routing identifier 725. At 735, the IAB donor node 705 may transmit a DCI grant to the IAB relay node 710, scheduling a downlink resource for transmitting the delay-sensitive packet to the IAB relay node 710. The DCI grant transmitted at 735 may include the second routing identifier 725. Therefore, upon receipt of the DCI grant transmitted at 735, the IAB relay node 710 may identify the next hop for transmitting the delay-sensitive packet. In some examples, such as for the in-advance scheduling configuration 700, the IAB relay node 710 may identify the next hop prior to receiving the delay-sensitive packet. In some cases, the IAB donor node 705 may schedule the downlink resources with a scheduling gap of K0=2. Thus, the DCI grant may be transmitted in slot 1 and schedule downlink resources in slot 3.

At 740, the IAB donor node 705 may transmit the delay-sensitive packet to the IAB relay node 710. The IAB relay node 710 may begin processing the delay-sensitive packet. Processing the delay-sensitive packet at the IAB relay node 710 may take a first processing time 745. Prior to the end of the first processing time 745, the IAB relay node 710 may transmit a DCI grant to IAB relay node 715 at 750. The IAB relay node 710 may have identified the IAB relay node 715 as the next hop for the delay-sensitive packet based on its configured delay-sensitive routing table and the second routing identifier included in the DCI grant received at 735. The IAB relay node 715 may receive the DCI grant at 750 and identify UE 115-*f* as the next hop, or the recipient, of the delay-sensitive packet based on a configured delay-sensitive routing table and the second routing identifier 725 included in the DCI grant at 750. In some cases, the IAB relay node 710 may apply a scheduling gap of K0=1.

After the first processing time 745, the IAB relay node 710 may have successfully processed the delay-sensitive packet received at 740. The IAB relay node 710 may transmit the delay-sensitive packet to the IAB relay node 715 at 755. In some cases, the IAB relay node 710 may not successfully process the delay-sensitive packet, and the IAB relay node 710 may transmit a cancellation notice for the scheduled downlink resource. An example of an unsuccessfully process delay-sensitive packet is described with reference to FIG. 9.

The IAB relay node 715 may receive the delay-sensitive packet at 755 and begin processing the delay-sensitive packet. The IAB relay node 715 may take a second processing time 760 to process the delay-sensitive packet and, in some cases, determine whether the delay-sensitive packet has been successfully processed. At 765, the IAB relay node 715 may transmit a DCI grant to UE 115-*f* scheduling downlink resources for the delay-sensitive packet. The DCI grant transmitted at 765 may not have a scheduling delay (e.g., K0=0), and the IAB relay node 715 may transmit the delay-sensitive packet to UE 115-*f* within the same slot. In some cases, such as if UE 115-*f* is the final recipient of the delay-sensitive packet, the IAB relay node 715 may not include delay-sensitive routing information in the DCI grant transmitted to UE 115-*f*.

Figure 8:
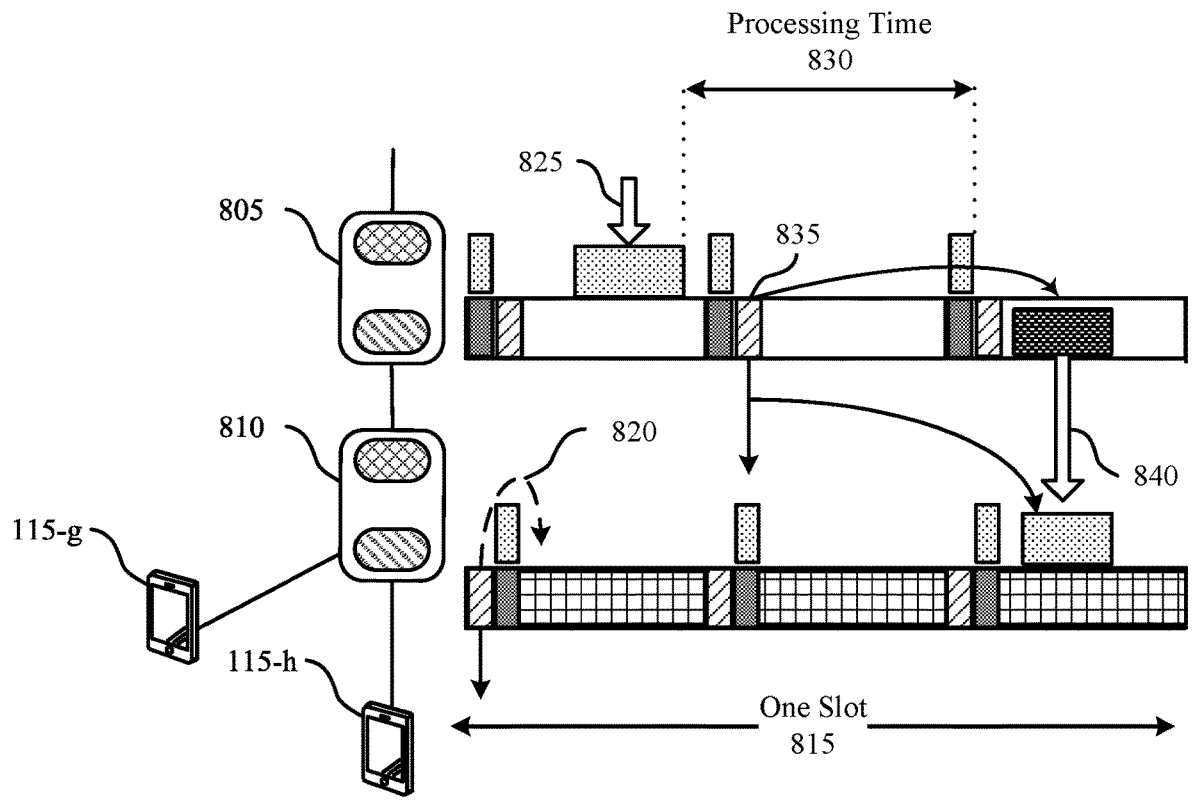

FIG. 8 illustrates an example of an in-advance scheduling configuration 800 that supports in-advance scheduling for low latency traffic in accordance with aspects of the present disclosure. In some examples, the in-advance scheduling configuration 800 may implement aspects of wireless communication system 100.

The in-advance scheduling configuration may include an IAB relay node 805 and an IAB relay node 810, which may each be an example of an IAB relay node 215 as described with reference to FIG. 2. IAB relay nodes 805 and 810 may be split into associated MT and base station DU entities, where MT functionality of the IAB relay nodes 805 and 810 may be controlled or scheduled by antecedent (e.g., donor) IAB nodes via wireless backhaul links. In some cases, IAB relay node 805 may be an example of a parent node to the IAB relay node 810, and the IAB relay node 810 may be an example of a child node to the IAB relay node 805.

The in-advance scheduling configuration 800 may be an example of a configuration which does not use a scheduling gap or has a scheduling gap value of K0=0. Therefore, a DCI grant may schedule a PDSCH occasion within the same slot.

In some cases, the in-advance scheduling configuration 800 may be described with reference to a single slot 815. The slot 815 may include multiple PDCCH occasions for mini-slot scheduling. In some cases, a mini-slot may include one or more symbol periods, where multiple mini-slots may make up the slot 815. The in-advance scheduling configuration 800 may implement techniques for in-advance scheduling, such as in-advance mini slot scheduling, as described herein.

In some cases, the in-advance scheduling configuration 800 may support overriding previous resource allocations to instead transmit delay-sensitive traffic. For example, at 820, IAB relay node 810 may transmit a DCI grant to an eMBB UE 115, such as UE 115-*g*. The DCI grant transmitted at 820 may schedule resources within the slot to use for eMBB communications with UE 115-*g*. For example, the DCI grant transmitted at 820 may schedule resources in the same mini-slot for eMBB communications.

At 825, the IAB relay node 805 may receive a packet for a URLLC UE 115 (e.g., UE 115-*h*). The packet may be an example of a delay-sensitive packet. The IAB relay node 805 may begin processing the delay-sensitive packet and, before completion of the processing (e.g., an end of a processing time 830), transmit a DCI grant to IAB relay node 810 at 835.

The DCI grant at 835 may indicate a downlink resource which may the IAB relay node 810 had previously allocated for eMBB communications with UE 115-*f*. In some cases, the DCI grant at 835 may override at least a part of the resource allocation for the eMBB communications, and instead use the overridden resources for delay-sensitive traffic. For example, the low latency or delay-sensitive communications may be given a higher priority over the eMBB communications. The IAB relay node 810 may monitor for the delay-sensitive packet based on the DCI grant at 835 instead of transmitting eMBB data to UE 115-*f* In some cases, the IAB relay node 810 may drop the eMBB communications to instead monitor for the delay-sensitive packet from the IAB relay node 805.

In some cases, the DCI grant at 835 may include routing information for the delay-sensitive packet. The IAB relay node 810 may then transmit a DCI grant to schedule a downlink resource for UE 115-*h* and transmit the delay-sensitive packet to UE 115-*h*.

Figure 9:
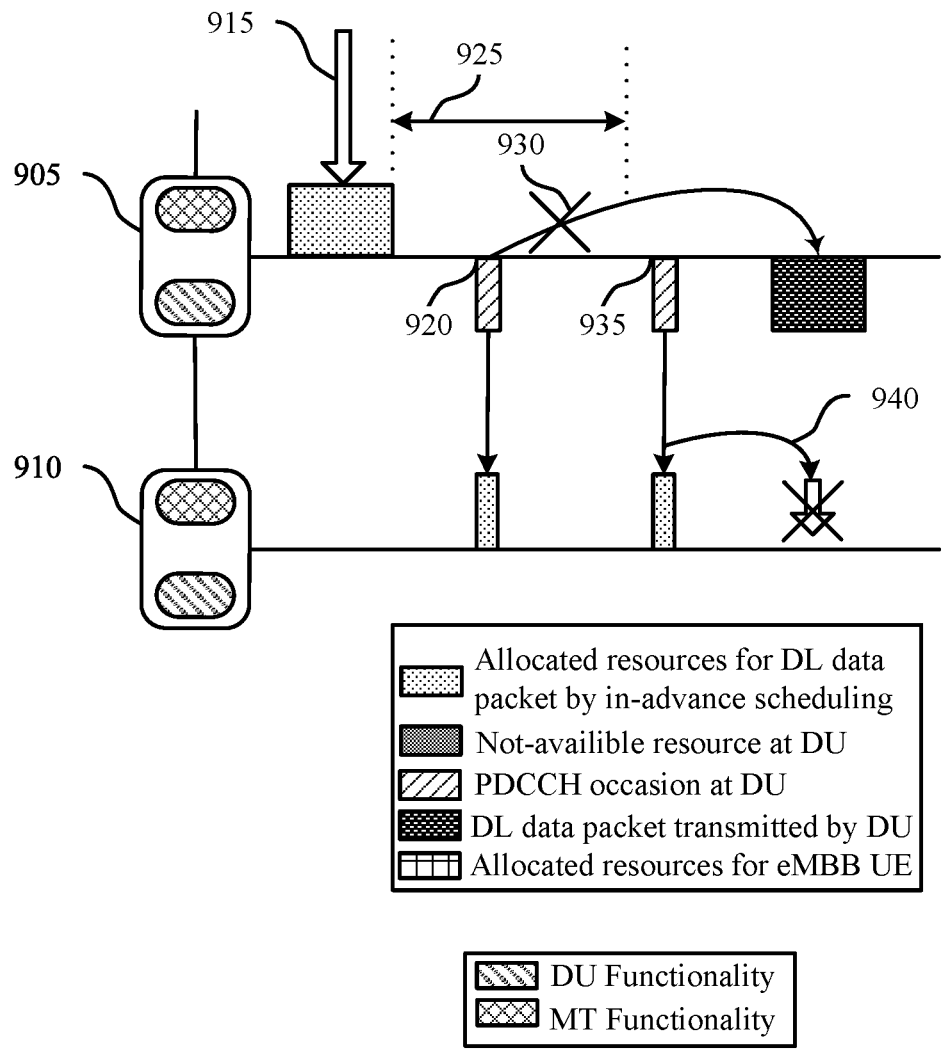
FIG. 9 illustrates an example of an in-advance scheduling with cyclic redundancy check failure that supports in-advance scheduling for low latency traffic in accordance with aspects of the present disclosure.

FIG. 9 illustrates an example of an in-advance scheduling with CRC failure 900 that supports in-advance scheduling for low latency traffic in accordance with aspects of the present disclosure. In some examples, the in-advance scheduling with CRC failure 900 may implement aspects of wireless communication system 100.

The in-advance scheduling configuration with CRC failure 900 may include an IAB relay node 905 and an IAB relay node 910, which may each be an example of an IAB relay node 215 as described with reference to FIG. 2. IAB relay nodes 905 and 910 may be split into associated MT and base station DU entities, where MT functionality of the IAB relay nodes 905 and 910 may be controlled or scheduled by antecedent (e.g., donor) IAB nodes via wireless backhaul links. In some cases, IAB relay node 905 may be an example of a parent node to the IAB relay node 910, and the IAB relay node 910 may be an example of a child node to the IAB relay node 905.

The in-advance scheduling configuration with CRC failure 900 may support in-advance scheduling techniques as described herein. However, the in-advance scheduling configuration with CRC failure may describe a case where an IAB node may not successfully process a delay-sensitive packet.

For example, IAB relay node 905 may receive a delay-sensitive packet at 915. At 920, the IAB relay node 905 may transmit a DCI grant to IAB relay node 910 (e.g., the next hop as indicated by a routing identifier) prior to an end of a processing time 925. The DCI grant at 920 may schedule a downlink resource for the IAB relay node 905 to transmit the delay-sensitive packet to the IAB relay node 910. However, the IAB relay node 905 may not successfully decode or process the delay-sensitive packet. For example, a CRC of the delay-sensitive packet may fail at 930. Therefore, the IAB relay node 905 may not be able to transmit the delay-sensitive packet to the IAB relay node 910. For example, the DU of the IAB relay node 905 may cancel transmission of the delay-sensitive packet when CRC fails.

Based on the CRC failure, the IAB relay node 905 may transmit a NACK for the delay-sensitive packet to its parent node. For example, the IAB relay node 905 may transmit a NACK to the parent node from which the IAB relay node 905 received the delay-sensitive packet. At a following PDCCH occasion for the DU of the IAB relay node 905, in some cases at the next PDCCH occasion, the DU may transmit a notification of cancellation for the delay-sensitive packet to the IAB relay node 910. For example, the notification of cancellation may be transmitted at 935 to indicate that transmission of the delay-sensitive packet at 940 is canceled. The child MT (e.g., of the IAB relay node 910) may then cancel related operations upon reception of the cancellation notification. For example, the IAB relay node 910 may refrain from monitoring for the packet, reception of the packet, decoding the packet, sending HARQ feedback (e.g., and ACK or NACK), updating a link-adaptation loop, or any combination thereof, among other processes.

Figure 10:
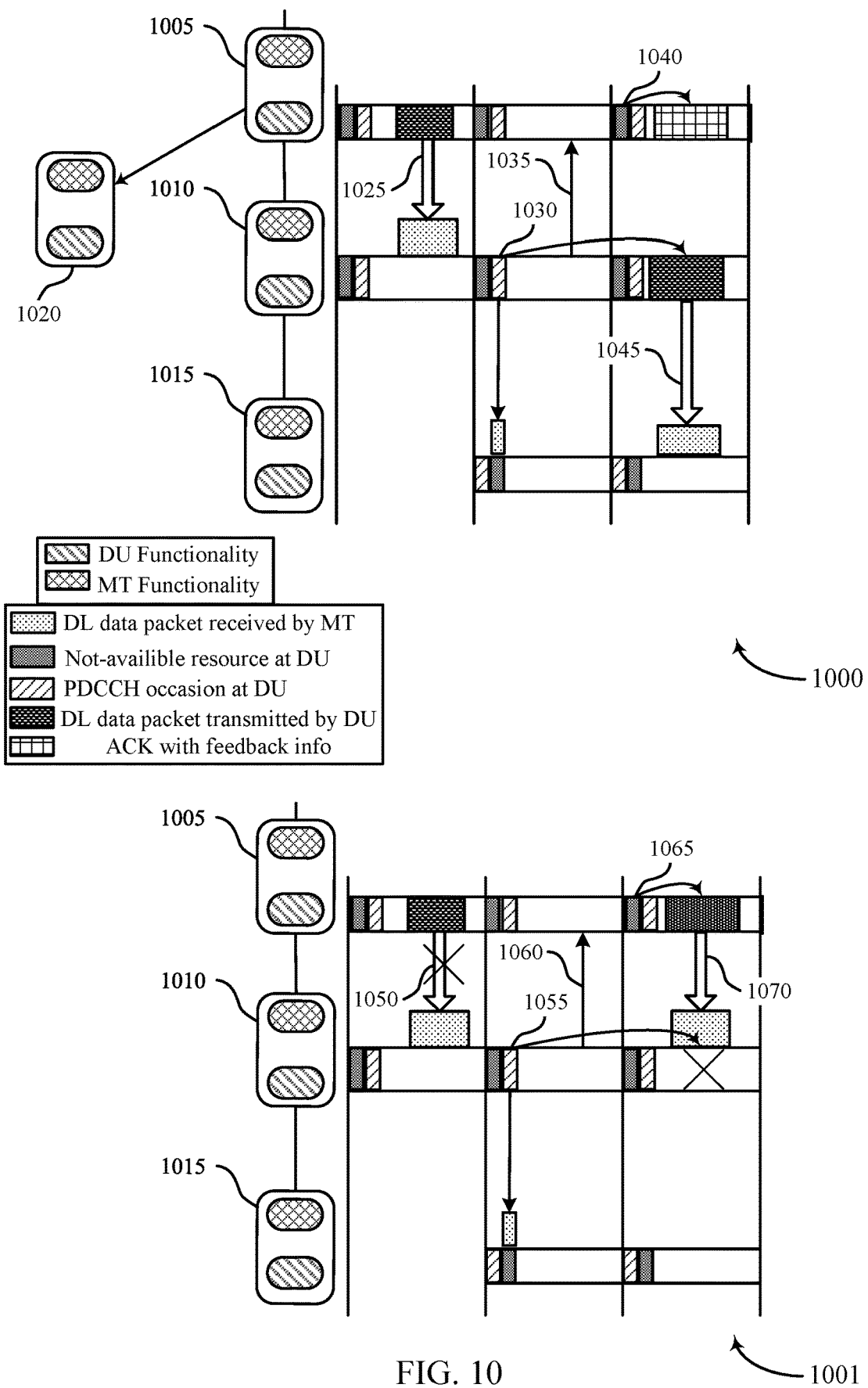
FIG. 10 illustrates examples of in-advance scheduling feedback schemes that support in-advance scheduling for low latency traffic in accordance with aspects of the present disclosure.

FIG. 10 illustrates examples of in-advance scheduling feedback schemes 1000 and 1001 that support in-advance scheduling for low latency traffic in accordance with aspects of the present disclosure. In some examples, the in-advance scheduling feedback schemes 1000 and 1001 may implement aspects of wireless communication system 100.

The in-advance scheduling feedback schemes 1000 and 1001 may include an IAB relay node 1005, an IAB relay node 1010, and an IAB relay node 1015 which may each be an example of an IAB relay node 215 as described with reference to FIG. 2. IAB relay node 1005 may be an example of a parent node to the IAB relay node 1010, and the IAB relay node 1015 may be an example of a child node to the IAB relay node 1010. The IAB relay nodes 1005, 1010, and 1015 may be split into associated MT and base station DU entities, where MT functionality of the IAB relay nodes may be controlled or scheduled by antecedent (e.g., donor) IAB nodes via wireless backhaul links. The in-advance scheduling feedback scheme 1000 may also include a child node 1020, which may be an example of an IAB relay node or a UE 115 as described herein.

The in-advance scheduling feedback schemes 1000 and 1001 may support in-advance scheduling as described herein. The feedback schemes may describe procedures for providing feedback for a delay-sensitive packet to a parent node. For example, the in-advance scheduling feedback scheme 1000 may describe providing positive ACK feedback for the delay-sensitive packet, and the in-advance scheduling feedback scheme 1001 may describe providing NACK feedback for the delay-sensitive packet.

With reference to the in-advance scheduling feedback scheme 1000, the IAB relay node 1005 may transmit a delay-sensitive packet to the IAB relay node 1010 at 1025 on a first downlink resource. The IAB relay node 1010 may monitor for the delay-sensitive packet on the first downlink resource, receive the delay-sensitive packet, and begin processing the delay-sensitive packet. Before the IAB relay node 1010 finishes processing the packet, the IAB relay node 1010 may, at 1030, transmit a DCI grant to the IAB relay node 1015. The DCI grant may include (e.g., be enhanced with) routing information for the delay-sensitive packet. The DCI grant may schedule a second downlink resource for the IAB relay node 1010 to transmit the delay-sensitive packet to the IAB relay node 1015.

In some cases, the IAB relay node 1010 may successfully process the delay-sensitive packet. The IAB relay node 1010 may then send an ACK to the parent node (e.g., the IAB relay node 1005) at 1035, indicating a successful reception, decoding and processing of the delay-sensitive packet. In some cases, the IAB relay node 1010 may include feedback information related to the second downlink resource and the DCI grant transmitted to the IAB relay node 1015. The feedback information may carry information such as scheduled resources by the in-advanced scheduling. For example, the feedback information may include scheduling information for the second downlink resource based on the DCI grant transmitted by the IAB relay node 1010.

Upon reception of the ACK with the feedback information, the parent node (e.g., the IAB relay node 1005) may know that the IAB relay node 1010 will use the indicated resources over its own child link. Then, the parent node may use the same resources for its other child nodes. For example, IAB relay node 1005 may determine that IAB relay node 1010 is using the second downlink resource to communicate with the IAB relay node 1015. This may enable the IAB relay node 1005 to use the second downlink resource to communicate with the child node 1020. At 1040, the IAB relay node 1005 may transmit a DCI grant to the child node 1020 scheduling a downlink transmission to the child node 1020.

With reference to the in-advance scheduling feedback scheme 1001, the IAB relay node 1005 may transmit a delay-sensitive packet to the IAB relay node 1010 at 1050 on a first downlink resource. The IAB relay node 1010 may monitor for the delay-sensitive packet on the first downlink resource, receive the delay-sensitive packet, and begin processing the delay-sensitive packet. Before the IAB relay node 1010 finishes processing the packet, the IAB relay node 1010 may, at 1055, transmit a DCI grant to the IAB relay node 1015. The DCI grant may include (e.g., be enhanced with) routing information for the delay-sensitive packet. The DCI grant may schedule a second downlink resource for the IAB relay node 1010 to transmit the delay-sensitive packet to the IAB relay node 1015.

However, the IAB relay node 1010 may not successfully process the delay-sensitive packet. The IAB relay node 1010 may then send a NACK to the parent node (e.g., the IAB relay node 1005) at 1060, indicating an unsuccessful reception, decoding, or processing of the delay-sensitive packet. In some cases, the IAB relay node 1010 may include feedback information related to the second downlink resource and the DCI grant transmitted to the IAB relay node 1015. The feedback information may carry information such as scheduled resources by the in-advanced scheduling. For example, the feedback information may include scheduling information for the second downlink resource based on the DCI grant transmitted by the IAB relay node 1010.

Upon reception of the NACK with the feedback information, the parent node may determine that the in-advance scheduling is canceled by the IAB node 1010 at the indicated resources. The parent node may, in some cases, use the indicated resources for a re-transmission of the delay-sensitive packet to the IAB node 1010. For example, at 1070, the IAB node 1005 may re-transmit the delay-sensitive packet to the IAB node 1010 during the second downlink resources. In some cases, the IAB node 1010 may cancel or drop the downlink transmission as scheduled by the DCI grant at 1055 and instead monitor for the re-transmitted delay-sensitive packet at 1070.

Figure 11:
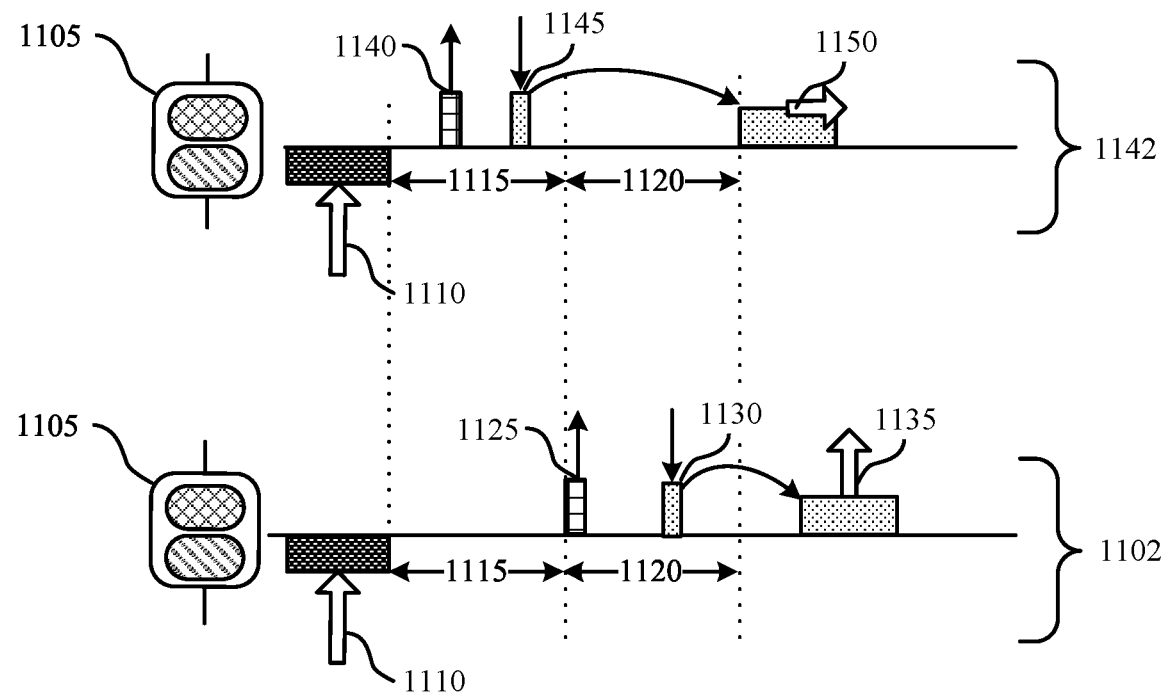
FIG. 11 illustrates an example of an in-advance uplink scheduling request configuration that supports in-advance scheduling for low latency traffic in accordance with aspects of the present disclosure.

FIG. 11 illustrates an example of an in-advance uplink scheduling request configuration 1100 that supports in-advance scheduling for low latency traffic in accordance with aspects of the present disclosure. In some examples, the in-advance uplink scheduling request configuration 1100 may implement aspects of wireless communication system 100.

The in-advance uplink scheduling request configuration 1100 may include an IAB relay node 1105, which may be an example of an IAB relay node 215 as described with reference to FIG. 2. The IAB relay node 1105 may be split into associated MT and base station DU entities, where MT functionality of the IAB relay node 1105 may be controlled or scheduled by antecedent (e.g., donor) IAB nodes via wireless backhaul links.

While techniques for in-advance scheduling have generally been described with reference to downlink transmissions, similar enhancements may be supported for uplink transmissions. For example, an uplink scheduling request may be enhanced similar to the enhanced DCI grant.

An example 1102 may describe a scheduling request transmission scheme for a conventional system. A DU of the IAB node 1105 may receive an uplink data packet. The uplink data packet may be an example of a delay-sensitive uplink packet. In the example 1102, the IAB node 1105 may first process the delay-sensitive uplink packet before transmitting a scheduling request to a parent node. The delay-sensitive uplink packet may take a first processing time 1115 to process. Therefore, after the first processing time 1115, the IAB relay node 1105 may transmit the uplink scheduling request at 1125 to the parent node.

After the first processing time, the IAB relay node 1105 may begin a second processing time 1120 to encode the uplink the delay-sensitive uplink packet. In some cases, the IAB relay node 1105 may receive an uplink DCI grant scheduling an uplink resource for the IAB node 1105 to transmit the delay-sensitive uplink packet to the parent node. In some cases, based on a scheduling gap (e.g., K2) between the uplink DCI grant at 1130 and the uplink resource, the uplink resource may be scheduled after the second processing time 1120 ends. This may result in delay for the delay-sensitive uplink packet, as the delay-sensitive uplink packet may be ready to send immediately after the second uplink processing time.

In an example 1142, the scheduling request may instead be sent at 1140 during the first processing time 1115. The IAB relay node 1105 may then receive the uplink DCI grant during the first processing time 1115, and the uplink resource may be scheduled closer to the end of the second processing time 1120.

In some cases, the scheduling request used for delay-sensitive or low latency traffic described herein may include routing information similar to the enhanced DCI grant. For example, the scheduling request may include a routing identifier, which can be used to identify the next hop toward the IAB donor node (e.g., if there are multiple parent nodes for the IAB node). The IAB node receiving the delay-sensitive uplink packet with routing information may select an IAB node corresponding to the shortest path to the IAB donor node for the next hop.

In some cases, techniques described for the enhanced downlink grant maybe applied for the uplink scheduling request. Aspects of techniques described with reference to FIGS. 5 through 10 may be applied to the uplink scheduling request. For example, cancellation notification, feedback information including scheduling information, and resource management techniques may also be applied for the uplink scheduling request for low latency or delay-sensitive traffic.

Figure 12:
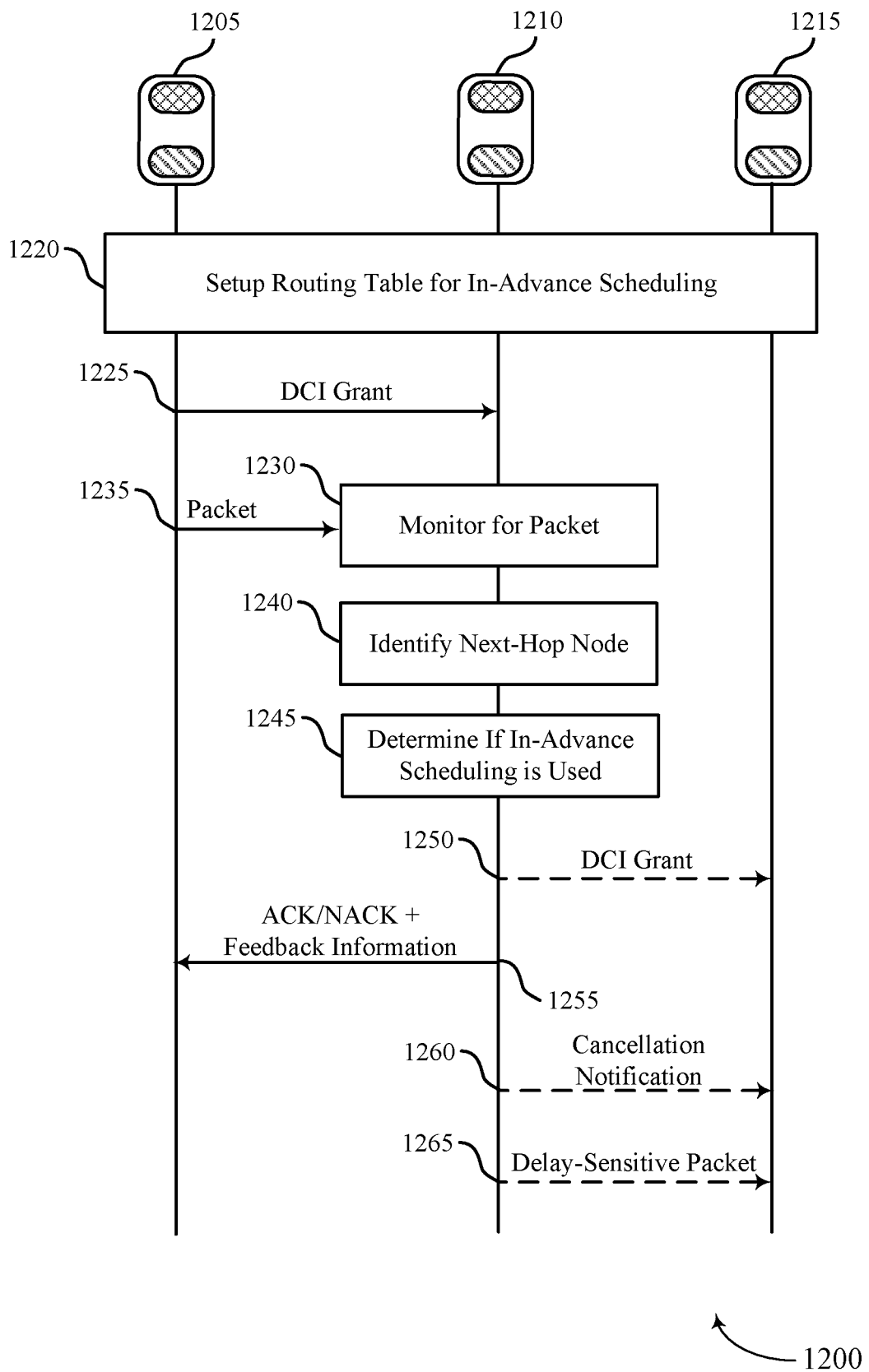
FIG. 12 illustrates an example of a process flow that supports in-advance scheduling for low latency traffic in accordance with aspects of the present disclosure.

FIG. 12 illustrates an example of a process flow 1200 that supports in-advance scheduling for low latency traffic in accordance with aspects of the present disclosure. In some examples, the process flow 1200 may implement aspects of wireless communication system 100. The process flow 1200 may include a parent node 1205, an IAB relay node 1210, and a child node 1215. The IAB relay node 1210 may be an example of an IAB node 215 as described with reference to FIG. 2. The parent node 1205 may be an example of an IAB relay node 215 or an IAB donor node 210 as described with reference to FIG. 2. The child node 1205 may be an example of an IAB relay node 215 or a UE 115 as described with reference to FIG. 2.

At 1220, the parent node 1205, the IAB relay node 1210, and the child node 1215 may setup a routing table to use for in-advance scheduling. In some cases, additional nodes or devices, such as the CU of an IAB donor node, may also setup the routing table. In some cases, the routing table may be established during a data bearer setup phase. For example, the IAB relay node 1210 may establish a data bearer with at least the parent node 1205 and the child node 1215, where the routing table is configured during a data bearer setup phase to establish the data bearer. In some cases, the routing table may include routing information based on a low latency or delay-sensitive data beater established between the nodes.

At 1225, the IAB relay node 1210 may receive, from the parent node 1205, a first downlink grant scheduling a first downlink resource for a delay-sensitive packet. The downlink grant received at 1225 may be an example of an enhanced downlink grant (e.g., a DCI grant with delay-sensitive routing information) described herein.

At 1240, the IAB relay node 1210 may monitor the first downlink resource for the delay sensitive packet from the second wireless device. At 1235, the parent node 1205 may transmit the delay-sensitive packet to the IAB relay node 1210. At 1235, the IAB relay node 1210 may receive the delay-sensitive packet from the second wireless device on the first downlink resource based on the monitoring. In some cases, the IAB relay node 1210 may begin to process the delay-sensitive packet upon receiving the delay-sensitive packet.

At 1240, the IAB relay node 1210 may identify the next-hop node from a routing identifier included in the DCI grant. For example, the IAB relay node 1210 may identify a first routing identifier in the first downlink grant, the first routing identifier indicating at least a third wireless device. The IAB relay node 1210 may identify the third wireless device from a routing table based on the first routing identifier.

At 1245, the IAB relay node 1210 may determine whether in-advance scheduling is to be used. For example, the IAB relay node 1210 may identify, based on the first downlink grant, that downlink control information carrying the first downlink grant supports in-advance scheduling. If in-advance scheduling is not used, the IAB relay node 1210 may wait to transmit a second downlink grant after the delay-sensitive packet is received and processed successfully.

If in-advance scheduling is used, the IAB relay node 1210 may send a second grant to the next-hop before completion of processing of the received data packet at 1250. For example, the IAB relay node 1210 may transmit, to the child node 1215, a second downlink grant scheduling a second downlink resource. In some cases, the second downlink grant includes a second routing identifier based on the first routing identifier. For example, the IAB relay node 1210 may determine a processing time for processing the delay-sensitive packet. At 1250, the IAB relay node 1210 may transmit the second downlink grant prior to an end of the processing time. In some cases, the delay-sensitive routing information in the second downlink grant may be optionally included. For example, if the child node 1215 is the intended recipient of the delay-sensitive packet, the routing information may not be included.

In some cases, at 1255, the IAB relay node 1210 may transmit feedback information for the delay-sensitive packet to the parent node 1205. The feedback information may include HARQ feedback (e.g., ACK/NACK feedback) and information on in-advance scheduling. For example, the HARQ feedback may include scheduling information based on the second downlink grant. In some cases, the IAB relay node 1210 may begin processing the delay-sensitive packet and determine that the delay-sensitive packet is unsuccessfully processed based on a CRC of the delay-sensitive packet. If CRC for the delay-sensitive packet fail, the IAB relay node 1210 may transmit a cancellation indication to the child node 1215.

Figure 13:
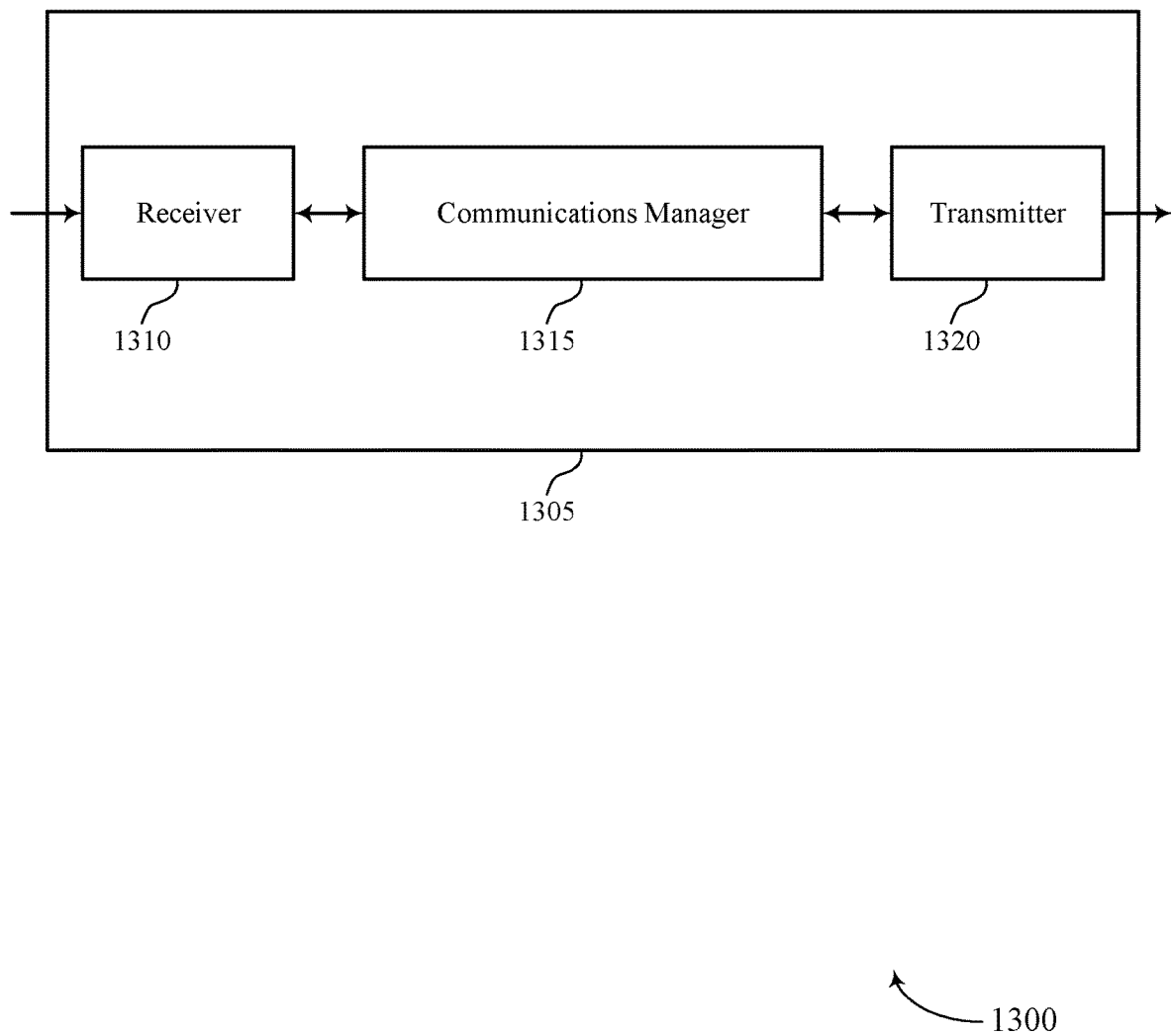
FIGS. 13 and 14 show block diagrams of devices that support in-advance scheduling for low latency traffic in accordance with aspects of the present disclosure.

FIG. 13 shows a block diagram 1300 of a device 1305 that supports in-advance scheduling for low latency traffic in accordance with aspects of the present disclosure. The device 1305 may be an example of aspects of a UE 115 or base station 105 as described herein. The device 1305 may include a receiver 1310, a communications manager 1315, and a transmitter 1320. The device 1305 may also include a processor. Each of these components may be in communication with one another (e.g., via one or more buses).

Receiver 1310 may receive information such as packets, user data, or control information associated with various information channels (e.g., control channels, data channels, and information related to in-advance scheduling for low latency traffic, etc.). Information may be passed on to other components of the device 1305. The receiver 1310 may be an example of aspects of the transceiver 1620 or 1720 as described with reference to FIGS. 16 and 17. The receiver 1310 may utilize a single antenna or a set of antennas.

The communications manager 1315 may receive, from a second wireless device, a first downlink grant scheduling a first downlink resource for a delay-sensitive packet, monitor the first downlink resource for the delay-sensitive packet from the second wireless device, identify a first routing identifier in the first downlink grant, the first routing identifier indicating at least a third wireless device, and transmit, to the third wireless device, a second downlink grant scheduling a second downlink resource. In some cases, the second downlink grant includes a second routing identifier based on the first routing identifier. The communications manager 1315 may also receive, from a second wireless device, an uplink delay-sensitive packet, determine a processing time for processing the uplink delay-sensitive packet at the first wireless device, transmit, prior to an end of the processing time, a scheduling request to a third wireless device based on the uplink delay-sensitive packet, receive, from the third wireless device, an uplink grant for transmitting the uplink delay-sensitive packet, and transmit the uplink delay-sensitive packet to the third wireless device based on the uplink grant. The communications manager 1315 may be an example of aspects of the communications manager 1610 or 1710 as described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 or 1720 as described with reference to FIGS. 16 and 17. The transmitter 1320 may utilize a single antenna or a set of antennas.

Figure 14:
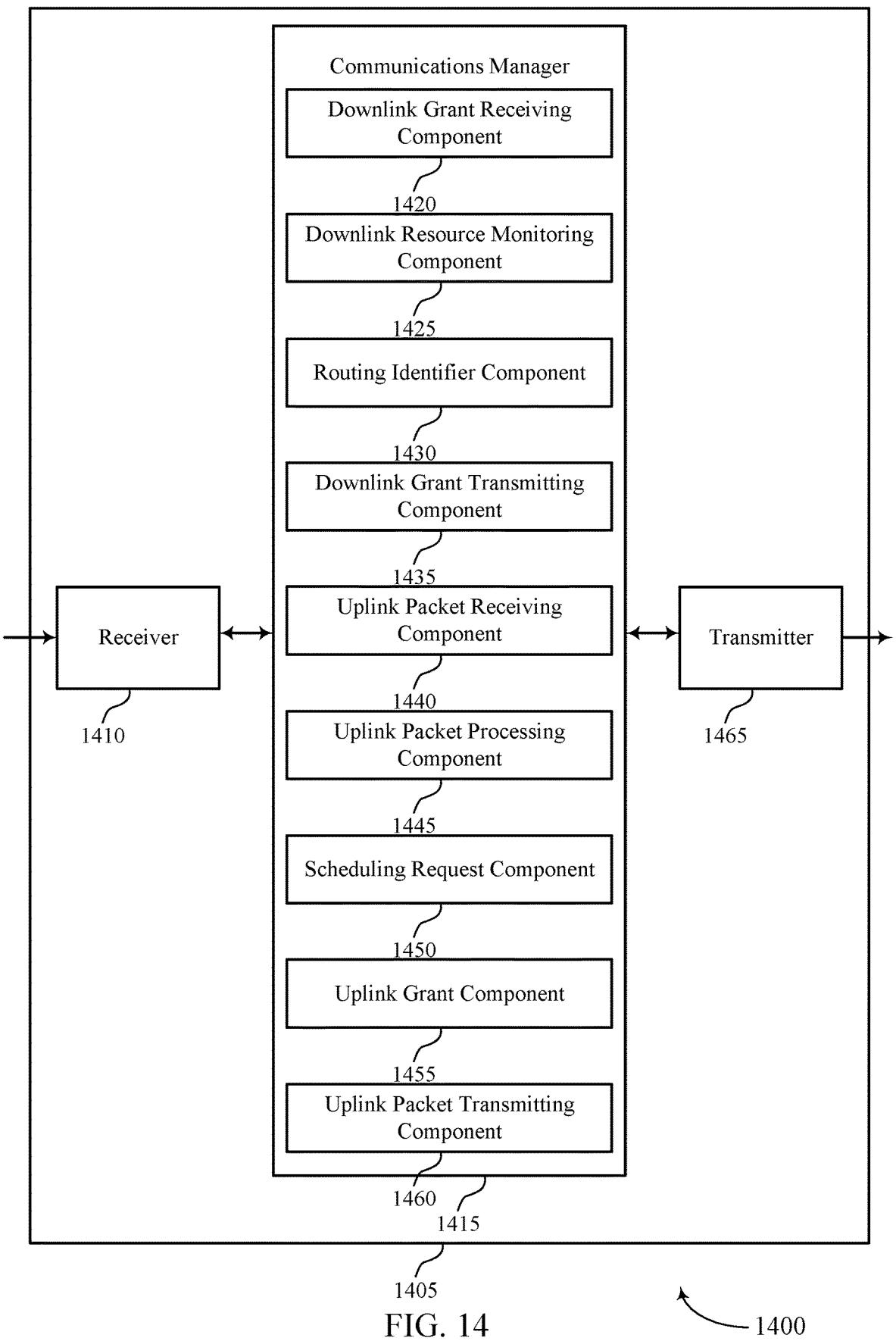

FIG. 14 shows a block diagram 1400 of a device 1405 that supports in-advance scheduling for low latency traffic in accordance with aspects of the present disclosure. The device 1405 may be an example of aspects of a device 1305, a UE 115, or a base station 105 as described herein. The device 1405 may include a receiver 1410, a communications manager 1415, and a transmitter 1465. The device 1405 may also include a processor. Each of these components may be in communication with one another (e.g., via one or more buses).

Receiver 1410 may receive information such as packets, user data, or control information associated with various information channels (e.g., control channels, data channels, and information related to in-advance scheduling for low latency traffic, etc.). Information may be passed on to other components of the device 1405. The receiver 1410 may be an example of aspects of the transceiver 1620 or 1720 as described with reference to FIGS. 16 and 17. The receiver 1410 may utilize a single antenna or a set of antennas.

The communications manager 1415 may be an example of aspects of the communications manager 1315 as described herein. The communications manager 1415 may include a downlink grant receiving component 1420, a downlink resource monitoring component 1425, a routing identifier component 1430, a downlink grant transmitting component 1435, an uplink packet receiving component 1440, an uplink packet processing component 1445, a scheduling request component 1450, an uplink grant component 1455, and an uplink packet transmitting component 1460. The communications manager 1415 may be an example of aspects of the communications manager 1610 or 1710 as described herein.

The downlink grant receiving component 1420 may receive, from a second wireless device, a first downlink grant scheduling a first downlink resource for a delay-sensitive packet. The downlink resource monitoring component 1425 may monitor the first downlink resource for the delay-sensitive packet from the second wireless device. The routing identifier component 1430 may identify a first routing identifier in the first downlink grant, the first routing identifier indicating at least a third wireless device. The downlink grant transmitting component 1435 may transmit, to the third wireless device, a second downlink grant scheduling a second downlink resource. In some cases, the second downlink grant includes a second routing identifier based on the first routing identifier.

The uplink packet receiving component 1440 may receive, from a second wireless device, an uplink delay-sensitive packet. The uplink packet processing component 1445 may determine a processing time for processing the uplink delay-sensitive packet at the first wireless device. The scheduling request component 1450 may transmit, prior to an end of the processing time, a scheduling request to a third wireless device based on the uplink delay-sensitive packet. The uplink grant component 1455 may receive, from the third wireless device, an uplink grant for transmitting the uplink delay-sensitive packet. The uplink packet transmitting component 1460 may transmit the uplink delay-sensitive packet to the third wireless device based on the uplink grant.

Transmitter 1465 may transmit signals generated by other components of the device 1405. In some examples, the transmitter 1465 may be collocated with a receiver 1410 in a transceiver module. For example, the transmitter 1465 may be an example of aspects of the transceiver 1620 or 1720 as described with reference to FIGS. 16 and 17. The transmitter 1465 may utilize a single antenna or a set of antennas.

Figure 15:
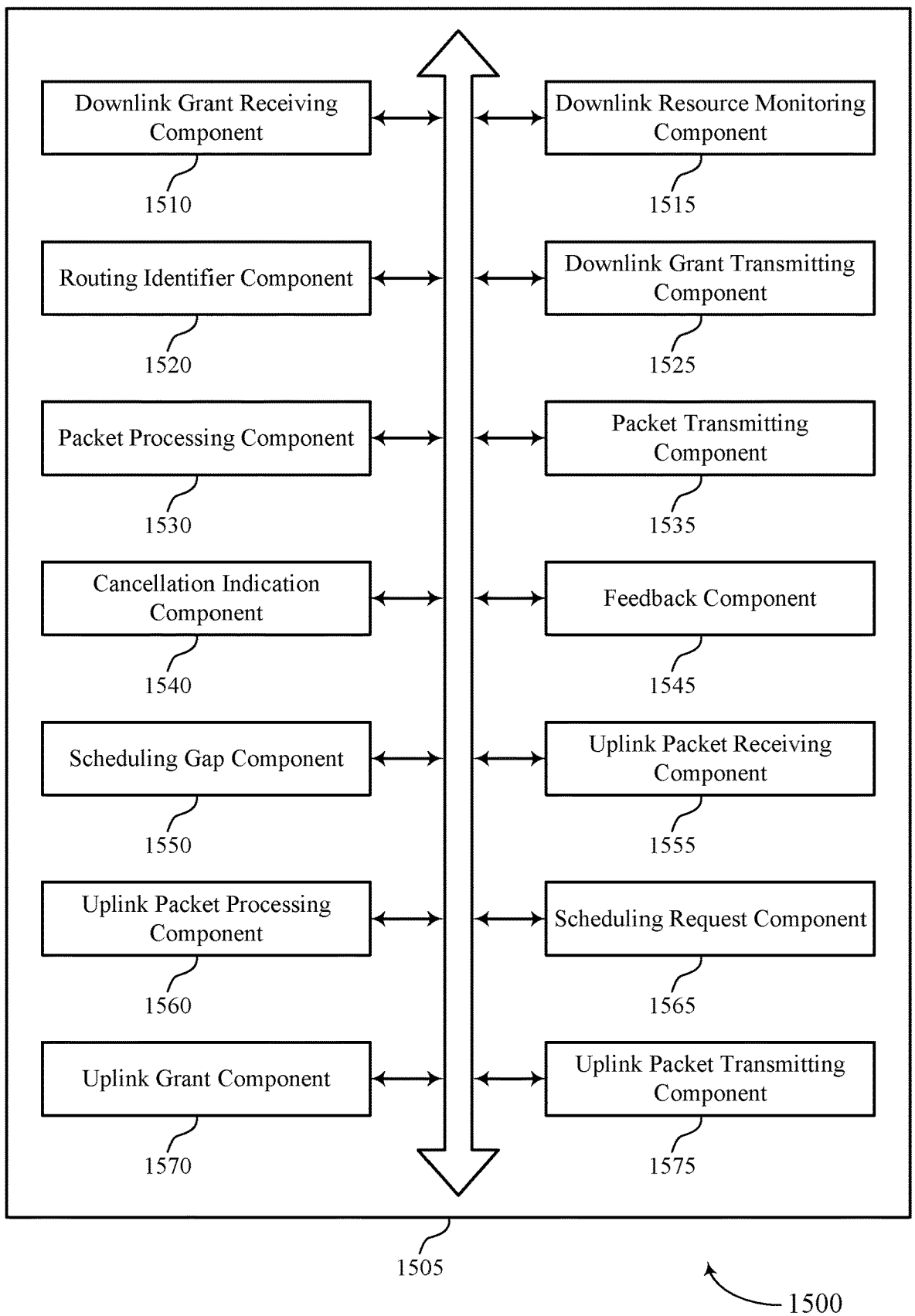
FIG. 15 shows a block diagram of a communications manager that supports in-advance scheduling for low latency traffic in accordance with aspects of the present disclosure.

FIG. 15 shows a block diagram 1500 of a communications manager 1505 that supports in-advance scheduling for low latency traffic in accordance with aspects of the present disclosure. The communications manager 1505 may be an example of aspects of a communications manager 1315, a communications manager 1415, or a communications manager 1610 described herein. The communications manager 1505 may include a downlink grant receiving component 1510, a downlink resource monitoring component 1515, a routing identifier component 1520, a downlink grant transmitting component 1525, a packet processing component 1530, a packet transmitting component 1535, a cancellation indication component 1540, a feedback component 1545, a scheduling gap component 1550, an uplink packet receiving component 1555, an uplink packet processing component 1560, a scheduling request component 1565, an uplink grant component 1570, and an uplink packet transmitting component 1575. Each of these modules may communicate, directly or indirectly, with one another (e.g., via one or more buses).

The downlink grant receiving component 1510 may receive, from a second wireless device, a first downlink grant scheduling a first downlink resource for a delay-sensitive packet.

In some examples, the downlink grant receiving component 1510 may identify, based on the first downlink grant, that downlink control information carrying the first downlink grant supports in-advance scheduling.

In some cases, the first wireless device and is IAB node of an IAB network, and the second wireless device is a parent node of the IAB network which schedules the IAB node. In some cases, the parent node is another IAB node or an IAB donor node of the IAB network.

The downlink resource monitoring component 1515 may monitor the first downlink resource for the delay-sensitive packet from the second wireless device.

In some examples, the downlink resource monitoring component 1515 may receive the delay-sensitive packet from the second wireless device on the first downlink resource based on the monitoring.

In some examples, the downlink resource monitoring component 1515 may determine a low priority data packet is scheduled for the first downlink resource.

In some examples, the downlink resource monitoring component 1515 may drop reception of the low priority data packet.

In some examples, the downlink resource monitoring component 1515 may monitor for the delay-sensitive packet on the first downlink resource based on the determining.

The routing identifier component 1520 may identify a first routing identifier in the first downlink grant, the first routing identifier indicating at least a third wireless device.

In some examples, the routing identifier component 1520 may identify the third wireless device from a routing table based on the first routing identifier.

In some examples, the routing identifier component 1520 may configure the routing table including identifiers for a set of wireless devices.

In some examples, the routing identifier component 1520 may establish a data bearer with at least the second wireless device and the third wireless device, where the routing table is configured during a data bearer setup phase to establish the data bearer.

In some examples, the routing identifier component 1520 may receive, from the second wireless device, routing identifiers for a set of wireless devices.

In some examples, the routing identifier component 1520 may determine a set of transmission paths from the first wireless device to a donor node, where the scheduling request is transmitted to the third wireless device based on a shortest transmission path of the set of transmission paths.

In some examples, the routing identifier component 1520 may establish a data bearer with at least the second wireless device and the third wireless device, where a routing table is configured during a data bearer setup phase to establish the data bearer, and a routing identifier for the delay-sensitive packet is identified based on the routing table.

In some cases, the third wireless device is a child node of the first wireless device, where the child node is an IAB node of an IAB network or a UE of the IAB network.

The downlink grant transmitting component 1525 may transmit, to the third wireless device, a second downlink grant scheduling a second downlink resource.

In some examples, the downlink grant transmitting component 1525 may indicate to the third wireless device, via the second downlink grant, that downlink control information carrying the second downlink grant supports in-advance scheduling.

The uplink packet receiving component 1555 may receive, from a second wireless device, an uplink delay-sensitive packet.

The uplink packet processing component 1560 may determine a processing time for processing the uplink delay-sensitive packet at the first wireless device.

The scheduling request component 1565 may transmit, prior to an end of the processing time, a scheduling request to a third wireless device based on the uplink delay-sensitive packet.

In some examples, the scheduling request component 1565 may transmit a routing identifier for the uplink delay-sensitive packet with the scheduling request.

In some cases, the routing identifier includes an identifier for one or more wireless devices, the routing identifier indicating for the third wireless device to transmit the uplink delay-sensitive packet to at least one of the one or more wireless devices.

In some cases, the first wireless device is an integrated access and backhaul (IAB) node of an IAB network, the second wireless device is a child node scheduled by the IAB node in the IAB network, the third wireless device is a parent node scheduling the IAB node in the IAB network.

In some cases, the child node is another IAB node or a UE.

In some cases, the parent node is another IAB node or an IAB donor node.

The uplink grant component 1570 may receive, from the third wireless device, an uplink grant for transmitting the uplink delay-sensitive packet.

The uplink packet transmitting component 1575 may transmit the uplink delay-sensitive packet to the third wireless device based on the uplink grant.

The packet processing component 1530 may determine a processing time for processing the delay-sensitive packet, where the second downlink grant is transmitted prior to an end of the processing time.

In some examples, the packet processing component 1530 may process the delay-sensitive packet, the processing including decoding the delay-sensitive packet, processing Layer 2 information of the delay-sensitive packet, encoding the delay-sensitive packet for transmission, or any combination thereof.

In some cases, the second downlink grant is transmitted prior to the end of the processing time based on a scheduling gap between the second downlink grant and the second downlink resource for transmitting the delay-sensitive packet.

The packet transmitting component 1535 may transmit the delay-sensitive packet to the third wireless device on the second downlink resource based on the second downlink grant.

In some examples, the packet transmitting component 1535 may process the delay-sensitive packet successfully, where the delay-sensitive packet is transmitted to the third wireless device based on processing the delay-sensitive packet successfully.

In some examples, the packet transmitting component 1535 may determine a low priority data packet is scheduled for the second downlink resource.

In some examples, the packet transmitting component 1535 may drop transmission of the low priority data packet.

In some examples, the packet transmitting component 1535 may transmit the delay-sensitive packet on the second downlink resource based on the determining.

The cancellation indication component 1540 may receive a cancellation indication from the second wireless device.

In some examples, the cancellation indication component 1540 may cease to monitor the first downlink resource for the delay-sensitive packet.

In some examples, the cancellation indication component 1540 may process the delay-sensitive packet.

In some examples, the cancellation indication component 1540 may determine the delay-sensitive packet is unsuccessfully processed based on a cyclic redundancy check of the delay-sensitive packet.

In some examples, the cancellation indication component 1540 may transmit a cancellation indication to the third wireless device based on transmitting the second downlink grant.

The feedback component 1545 may transmit feedback information to the second wireless device with HARQ feedback for the delay-sensitive packet based on monitoring for the delay-sensitive packet on the first downlink resource, where the feedback information includes scheduling information associated with the second downlink grant, the second downlink resource, or both.

In some examples, the feedback component 1545 may receive updated scheduling information from the second wireless device based on the feedback information, where the updated scheduling information indicates a different transmission from the second wireless device is scheduled for the first wireless device on the second downlink resource.

In some examples, receiving feedback information for the delay-sensitive packet from the third wireless device, where the feedback information includes scheduling information associated with a third downlink grant, a third downlink resource, or both.

In some examples, the feedback component 1545 may schedule another transmission for the third downlink resource based on the feedback information.

The scheduling gap component 1550 may identify a downlink control channel occasion, where the second downlink grant is transmitted in the downlink control channel occasion, and where the identifying of the downlink control channel occasion is based on a scheduling gap between the second downlink grant and the second downlink resource.

In some cases, the scheduling gap spans a set of slots.

In some cases, the scheduling gap spans a single slot, the single slot including a set of mini-slots.

Figure 16:
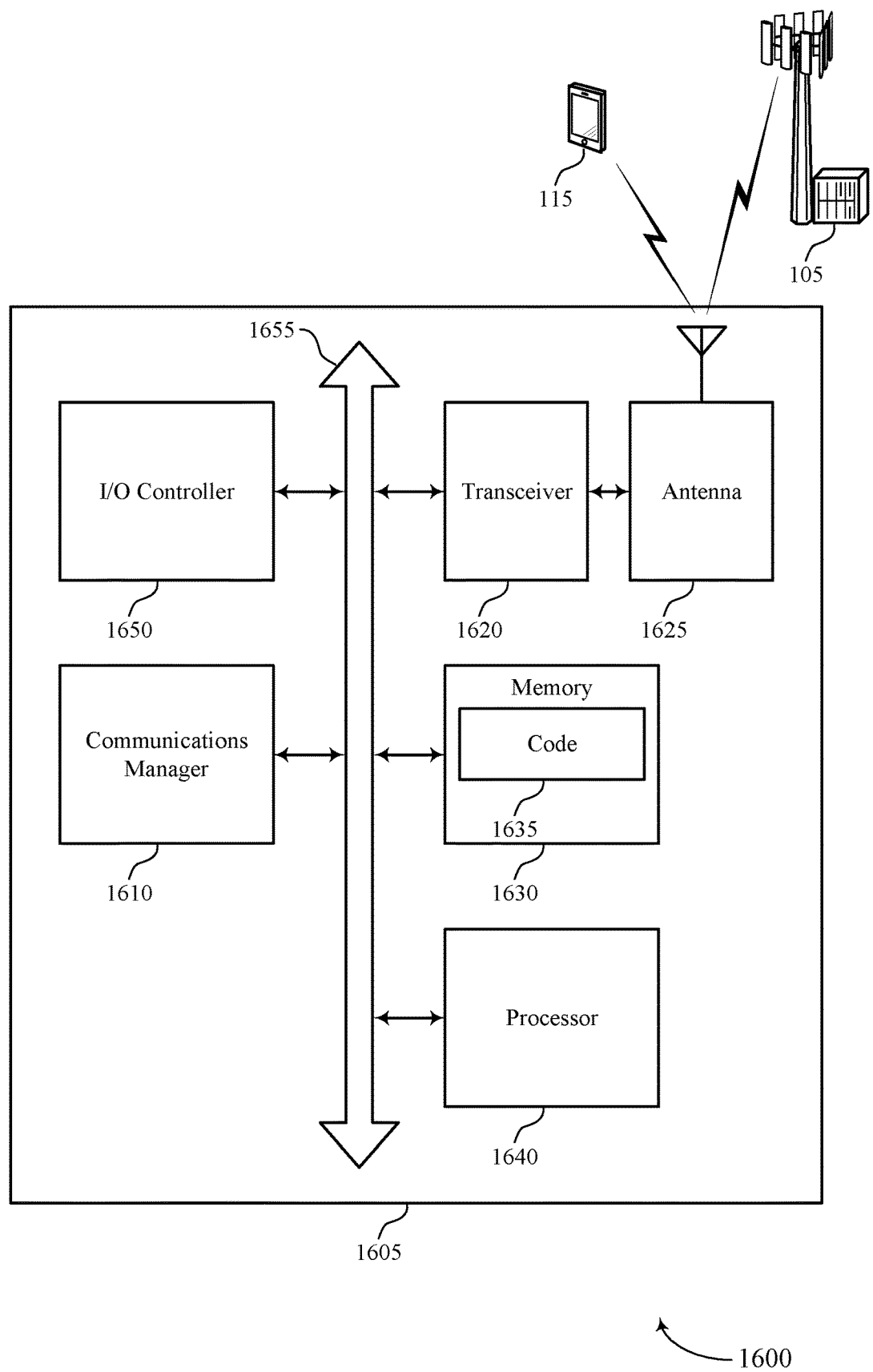
FIG. 16 shows a diagram of a system including a user equipment (UE) that supports in-advance scheduling for low latency traffic in accordance with aspects of the present disclosure.

FIG. 16 shows a diagram of a system 1600 including a device 1605 that supports in-advance scheduling for low latency traffic in accordance with aspects of the present disclosure. The device 1605 may be an example of or include the components of device 1305, device 1405, or a UE 115 as described herein. The device 1605 may include components for bi-directional voice and data communications including components for transmitting and receiving communications, including a communications manager 1610, a transceiver 1620, an antenna 1625, memory 1630, a processor 1640, and an I/O controller 1650. These components may be in electronic communication via one or more buses (e.g., bus 1655).

The communications manager 1610 may receive, from a second wireless device, a first downlink grant scheduling a first downlink resource for a delay-sensitive packet, monitor the first downlink resource for the delay-sensitive packet from the second wireless device, identify a first routing identifier in the first downlink grant, the first routing identifier indicating at least a third wireless device, and transmit, to the third wireless device, a second downlink grant scheduling a second downlink resource. The communications manager 1610 may also receive, from a second wireless device, an uplink delay-sensitive packet, determine a processing time for processing the uplink delay-sensitive packet at the first wireless device, transmit, prior to an end of the processing time, a scheduling request to a third wireless device based on the uplink delay-sensitive packet, receive, from the third wireless device, an uplink grant for transmitting the uplink delay-sensitive packet, and transmit the uplink delay-sensitive packet to the third wireless device based on the uplink grant.

Transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting in-advance scheduling for low latency traffic).

The I/O controller 1650 may manage input and output signals for the device 1605. The I/O controller 1650 may also manage peripherals not integrated into the device 1605. In some cases, the I/O controller 1650 may represent a physical connection or port to an external peripheral. In some cases, the I/O controller 1650 may utilize an operating system such as iOS®, ANDROID®, MS-DOS®, MS-WINDOWS®, OS/2®, UNIX®, LINUX®, or another known operating system. In other cases, the I/O controller 1650 may represent or interact with a modem, a keyboard, a mouse, a touchscreen, or a similar device. In some cases, the I/O controller 1650 may be implemented as part of a processor. In some cases, a user may interact with the device 1605 via the I/O controller 1650 or via hardware components controlled by the I/O controller 1650.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
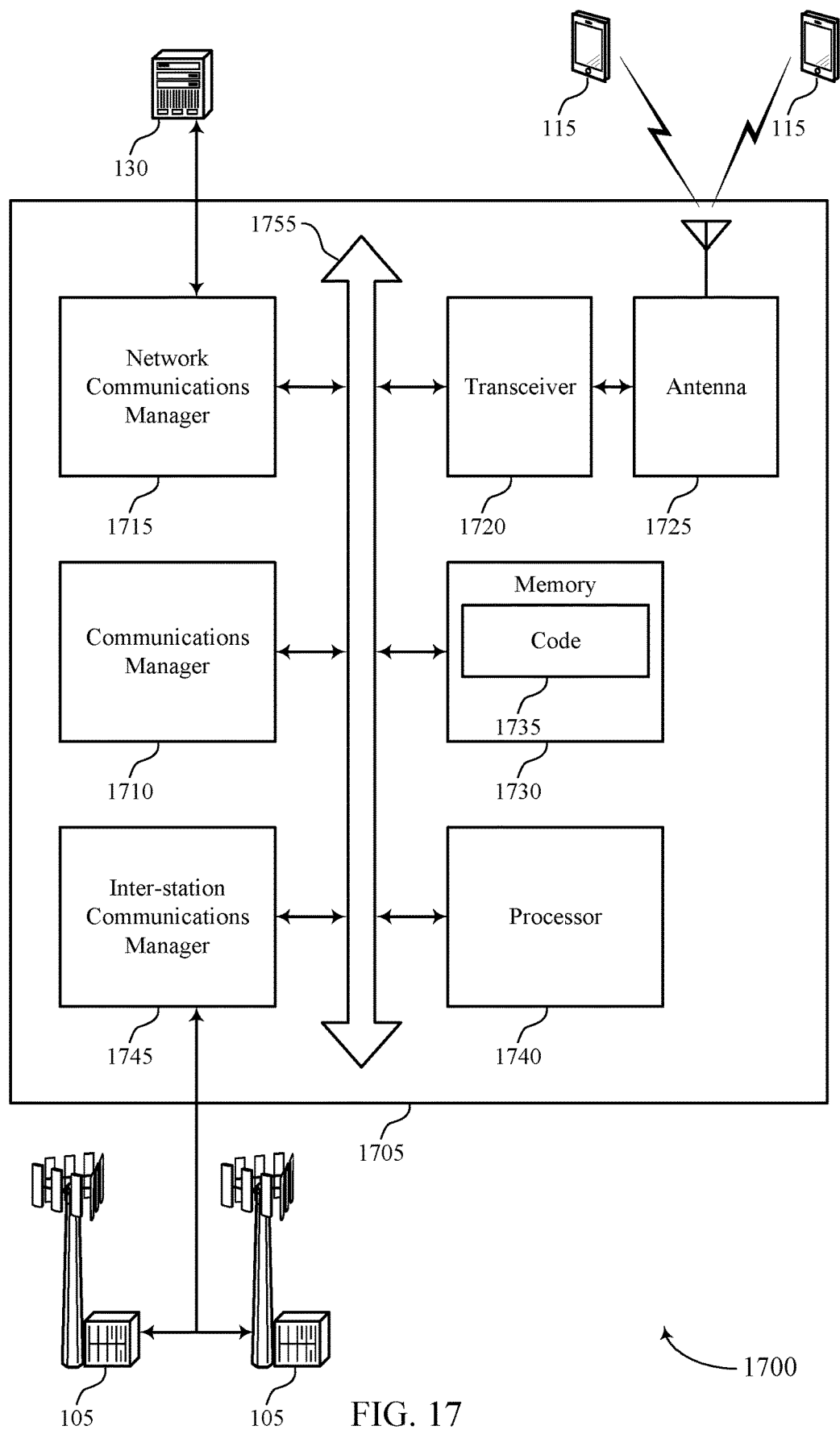
FIG. 17 shows a diagram of a system including a base station that supports in-advance scheduling for low latency traffic in accordance with aspects of the present disclosure.

FIG. 17 shows a diagram of a system 1700 including a device 1705 that supports in-advance scheduling for low latency traffic in accordance with aspects of the present disclosure. The device 1705 may be an example of or include the components of device 1305, device 1405, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1755).

The communications manager 1710 may receive, from a second wireless device, a first downlink grant scheduling a first downlink resource for a delay-sensitive packet, monitor the first downlink resource for the delay-sensitive packet from the second wireless device, identify a first routing identifier in the first downlink grant, the first routing identifier indicating at least a third wireless device, and transmit, to the third wireless device, a second downlink grant scheduling a second downlink resource. The communications manager 1710 may also receive, from a second wireless device, an uplink delay-sensitive packet, determine a processing time for processing the uplink delay-sensitive packet at the first wireless device, transmit, prior to an end of the processing time, a scheduling request to a third wireless device based on the uplink delay-sensitive packet, receive, from the third wireless device, an uplink grant for transmitting the uplink delay-sensitive packet, and transmit the uplink delay-sensitive packet to the third wireless device based on the uplink grant.

Network communications manager 1715 may manage communications with the core network (e.g., via one or more wired backhaul links). For example, the network communications manager 1715 may manage the transfer of data communications for client devices, such as one or more UEs 115.

Transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting in-advance scheduling for low latency traffic).

Inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
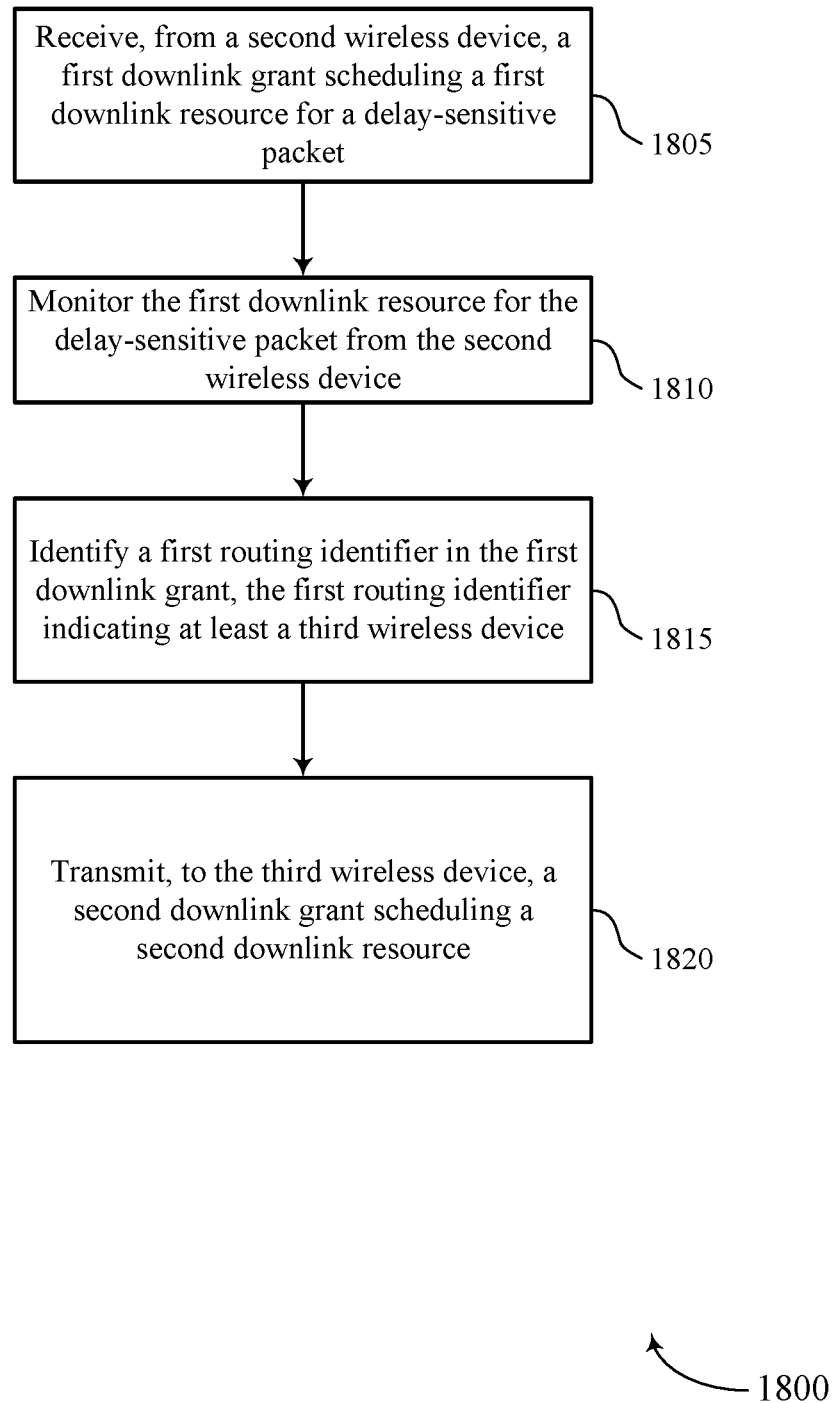
FIGS. 18 through 22 show flowcharts illustrating methods that support in-advance scheduling for low latency traffic in accordance with aspects of the present disclosure.

FIG. 18 shows a flowchart illustrating a method 1800 that supports in-advance scheduling for low latency traffic in accordance with aspects of the present disclosure. The operations of method 1800 may be implemented by a UE 115 or base station 105 or its components as described herein. For example, the operations of method 1800 may be performed by a communications manager as described with reference to FIGS. 13 through 17. In some examples, a UE or base station may execute a set of instructions to control the functional elements of the UE or base station to perform the functions described below. Additionally or alternatively, a UE or base station may perform aspects of the functions described below using special-purpose hardware.

At 1805, the UE or base station may receive, from a second wireless device, a first downlink grant scheduling a first downlink resource for a delay-sensitive packet. The operations of 1805 may be performed according to the methods described herein. In some examples, aspects of the operations of 1805 may be performed by a downlink grant receiving component as described with reference to FIGS. 13 through 17.

At 1810, the UE or base station may monitor the first downlink resource for the delay-sensitive packet from the second wireless device. The operations of 1810 may be performed according to the methods described herein. In some examples, aspects of the operations of 1810 may be performed by a downlink resource monitoring component as described with reference to FIGS. 13 through 17.

At 1815, the UE or base station may identify a first routing identifier in the first downlink grant, the first routing identifier indicating at least a third wireless device. The operations of 1815 may be performed according to the methods described herein. In some examples, aspects of the operations of 1815 may be performed by a routing identifier component as described with reference to FIGS. 13 through 17.

At 1820, the UE or base station may transmit, to the third wireless device, a second downlink grant scheduling a second downlink resource. The operations of 1820 may be performed according to the methods described herein. In some examples, aspects of the operations of 1820 may be performed by a downlink grant transmitting component as described with reference to FIGS. 13 through 17.

Figure 19:
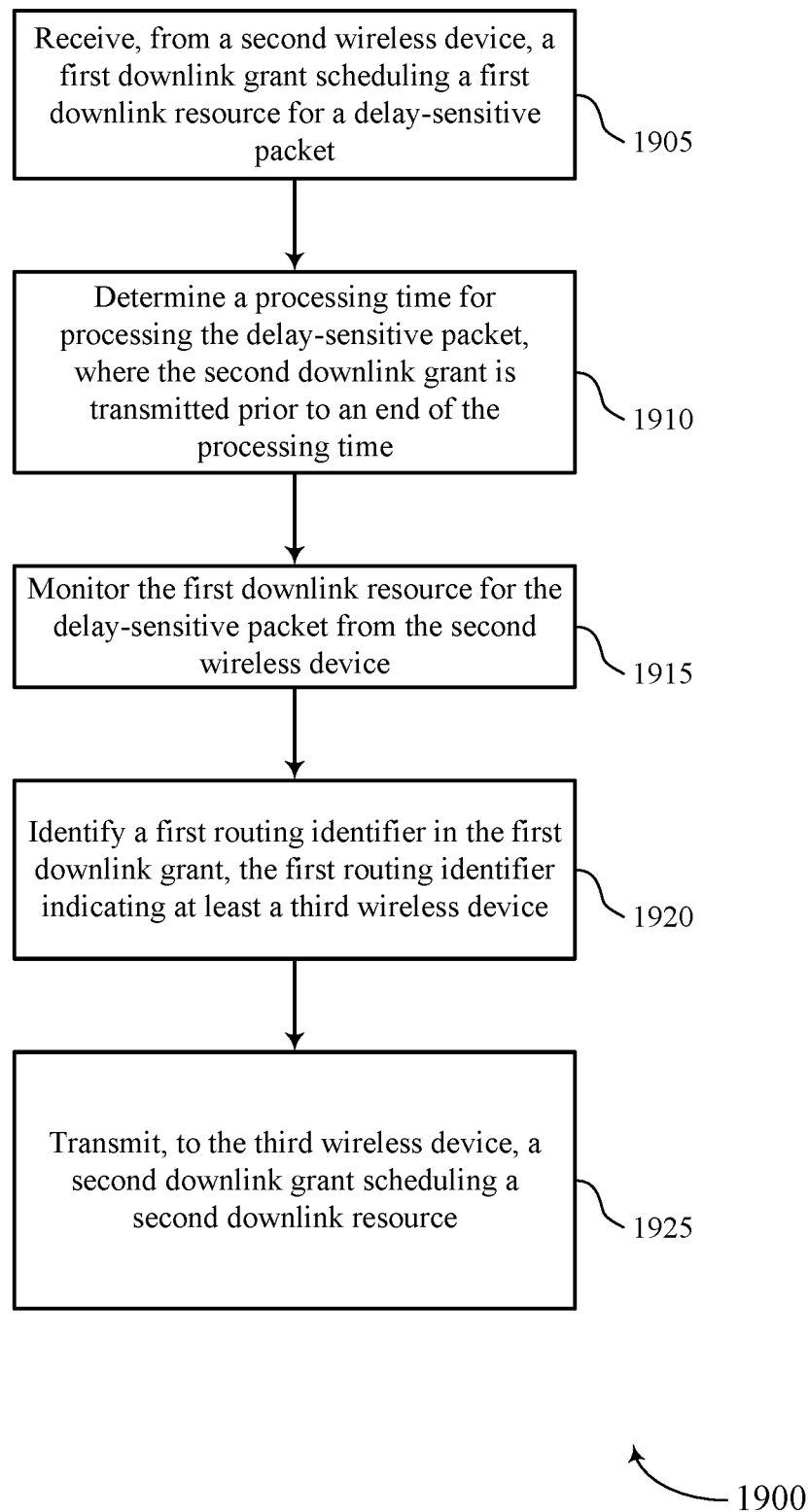

FIG. 19 shows a flowchart illustrating a method 1900 that supports in-advance scheduling for low latency traffic in accordance with aspects of the present disclosure. The operations of method 1900 may be implemented by a UE 115 or base station 105 or its components as described herein. For example, the operations of method 1900 may be performed by a communications manager as described with reference to FIGS. 13 through 17. In some examples, a UE or base station may execute a set of instructions to control the functional elements of the UE or base station to perform the functions described below. Additionally or alternatively, a UE or base station may perform aspects of the functions described below using special-purpose hardware.

At 1905, the UE or base station may receive, from a second wireless device, a first downlink grant scheduling a first downlink resource for a delay-sensitive packet. The operations of 1905 may be performed according to the methods described herein. In some examples, aspects of the operations of 1905 may be performed by a downlink grant receiving component as described with reference to FIGS. 13 through 17.

At 1910, the UE or base station may determine a processing time for processing the delay-sensitive packet, where the second downlink grant is transmitted prior to an end of the processing time. The operations of 1910 may be performed according to the methods described herein. In some examples, aspects of the operations of 1910 may be performed by a packet processing component as described with reference to FIGS. 13 through 17.

At 1915, the UE or base station may monitor the first downlink resource for the delay-sensitive packet from the second wireless device. The operations of 1915 may be performed according to the methods described herein. In some examples, aspects of the operations of 1915 may be performed by a downlink resource monitoring component as described with reference to FIGS. 13 through 17.

At 1920, the UE or base station may identify a first routing identifier in the first downlink grant, the first routing identifier indicating at least a third wireless device. The operations of 1920 may be performed according to the methods described herein. In some examples, aspects of the operations of 1920 may be performed by a routing identifier component as described with reference to FIGS. 13 through 17.

At 1925, the UE or base station may transmit, to the third wireless device, a second downlink grant scheduling a second downlink resource. The operations of 1925 may be performed according to the methods described herein. In some examples, aspects of the operations of 1925 may be performed by a downlink grant transmitting component as described with reference to FIGS. 13 through 17.

Figure 20:
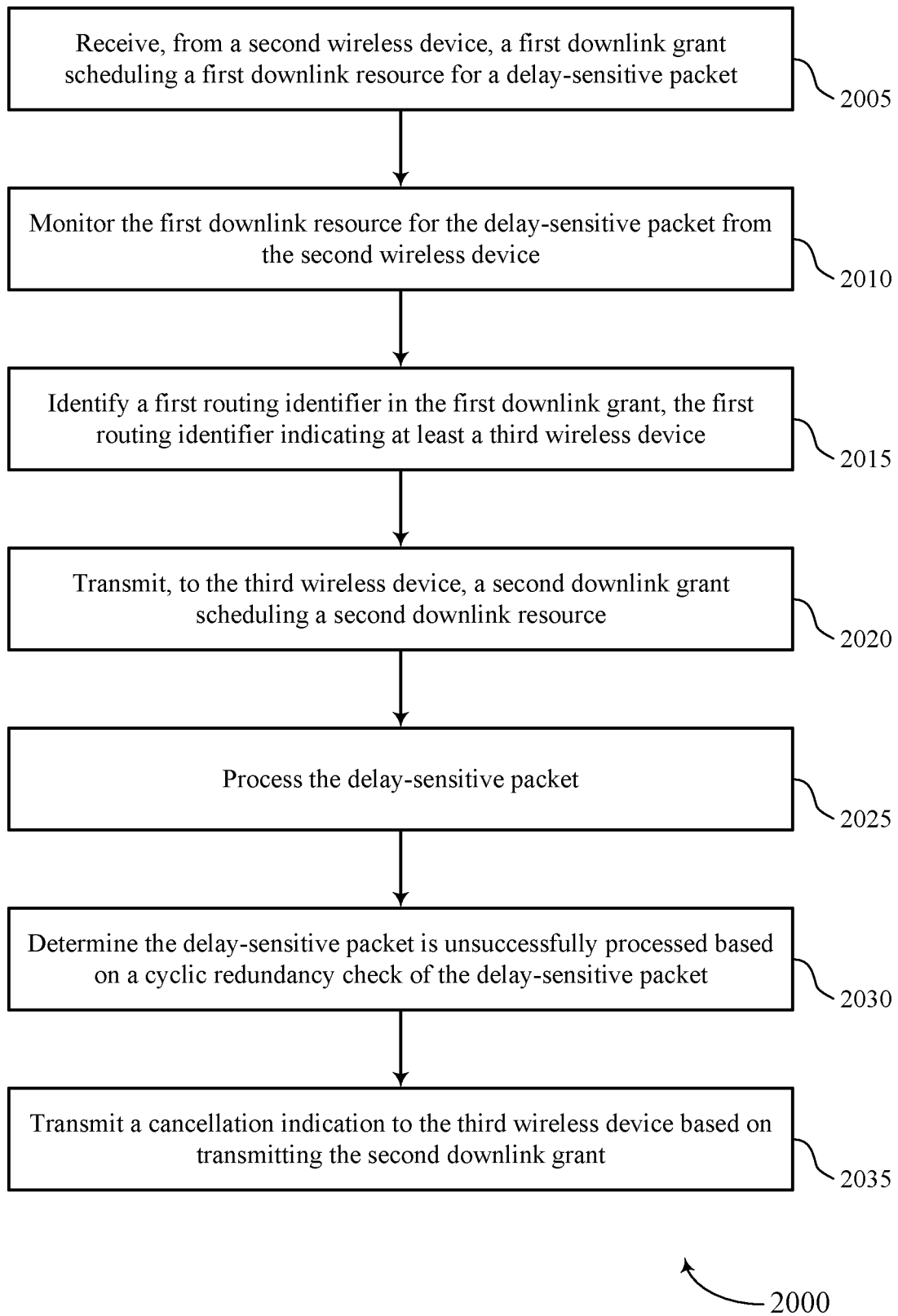

FIG. 20 shows a flowchart illustrating a method 2000 that supports in-advance scheduling for low latency traffic in accordance with aspects of the present disclosure. The operations of method 2000 may be implemented by a UE 115 or base station 105 or its components as described herein. For example, the operations of method 2000 may be performed by a communications manager as described with reference to FIGS. 13 through 17. In some examples, a UE or base station may execute a set of instructions to control the functional elements of the UE or base station to perform the functions described below. Additionally or alternatively, a UE or base station may perform aspects of the functions described below using special-purpose hardware.

At 2005, the UE or base station may receive, from a second wireless device, a first downlink grant scheduling a first downlink resource for a delay-sensitive packet. The operations of 2005 may be performed according to the methods described herein. In some examples, aspects of the operations of 2005 may be performed by a downlink grant receiving component as described with reference to FIGS. 13 through 17.

At 2010, the UE or base station may monitor the first downlink resource for the delay-sensitive packet from the second wireless device. The operations of 2010 may be performed according to the methods described herein. In some examples, aspects of the operations of 2010 may be performed by a downlink resource monitoring component as described with reference to FIGS. 13 through 17.

At 2015, the UE or base station may identify a first routing identifier in the first downlink grant, the first routing identifier indicating at least a third wireless device. The operations of 2015 may be performed according to the methods described herein. In some examples, aspects of the operations of 2015 may be performed by a routing identifier component as described with reference to FIGS. 13 through 17.

At 2020, the UE or base station may transmit, to the third wireless device, a second downlink grant scheduling a second downlink resource. The operations of 2020 may be performed according to the methods described herein. In some examples, aspects of the operations of 2020 may be performed by a downlink grant transmitting component as described with reference to FIGS. 13 through 17.

At 2025, the UE or base station may process the delay-sensitive packet. The operations of 2025 may be performed according to the methods described herein. In some examples, aspects of the operations of 2025 may be performed by a cancellation indication component as described with reference to FIGS. 13 through 17.

At 2030, the UE or base station may determine the delay-sensitive packet is unsuccessfully processed based on a cyclic redundancy check of the delay-sensitive packet. The operations of 2030 may be performed according to the methods described herein. In some examples, aspects of the operations of 2030 may be performed by a cancellation indication component as described with reference to FIGS. 13 through 17.

At 2035, the UE or base station may transmit a cancellation indication to the third wireless device based on transmitting the second downlink grant. The operations of 2035 may be performed according to the methods described herein. In some examples, aspects of the operations of 2035 may be performed by a cancellation indication component as described with reference to FIGS. 13 through 17.

Figure 21:
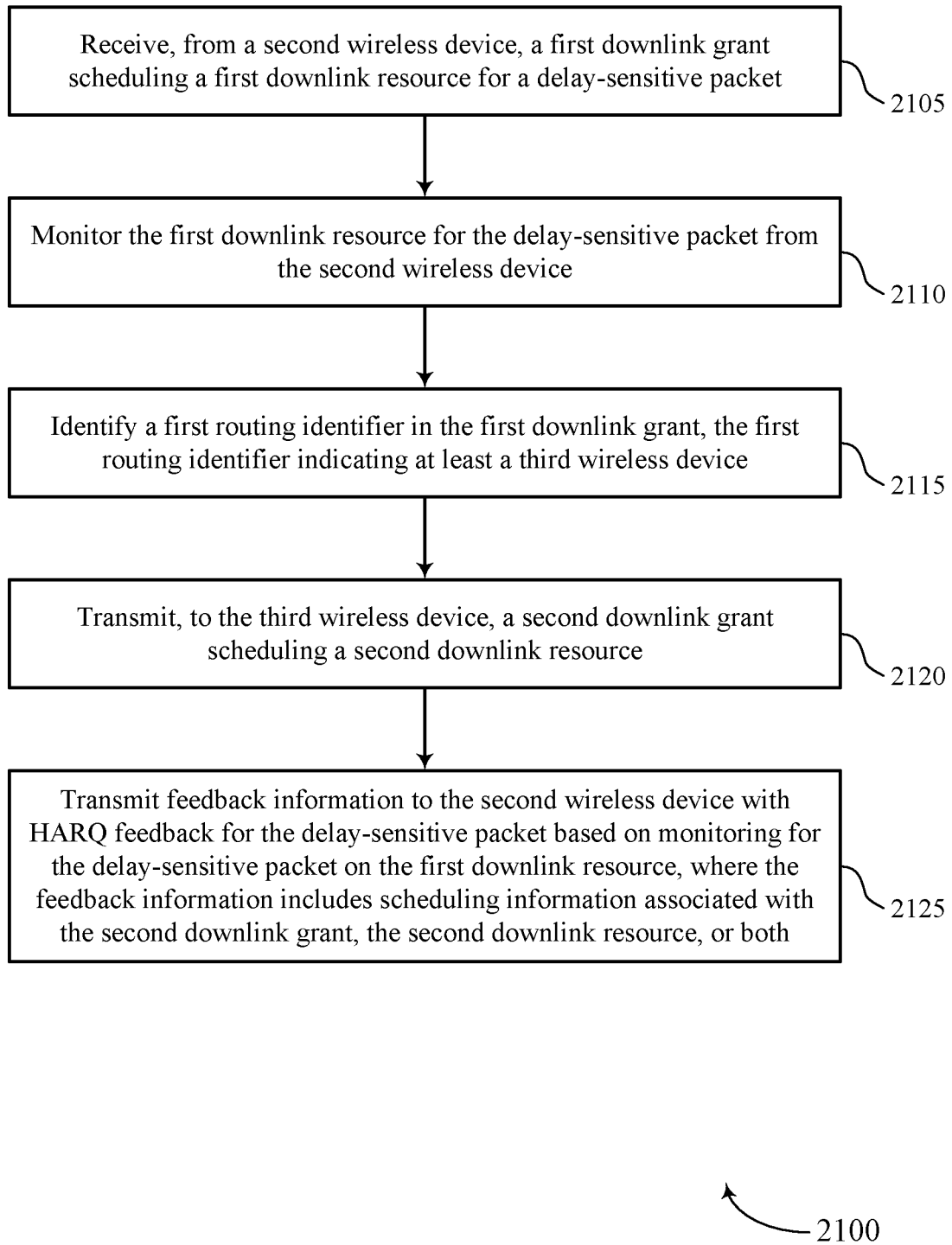

FIG. 21 shows a flowchart illustrating a method 2100 that supports in-advance scheduling for low latency traffic in accordance with aspects of the present disclosure. The operations of method 2100 may be implemented by a UE 115 or base station 105 or its components as described herein. For example, the operations of method 2100 may be performed by a communications manager as described with reference to FIGS. 13 through 17. In some examples, a UE or base station may execute a set of instructions to control the functional elements of the UE or base station to perform the functions described below. Additionally or alternatively, a UE or base station may perform aspects of the functions described below using special-purpose hardware.

At 2105, the UE or base station may receive, from a second wireless device, a first downlink grant scheduling a first downlink resource for a delay-sensitive packet. The operations of 2105 may be performed according to the methods described herein. In some examples, aspects of the operations of 2105 may be performed by a downlink grant receiving component as described with reference to FIGS. 13 through 17.

At 2110, the UE or base station may monitor the first downlink resource for the delay-sensitive packet from the second wireless device. The operations of 2110 may be performed according to the methods described herein. In some examples, aspects of the operations of 2110 may be performed by a downlink resource monitoring component as described with reference to FIGS. 13 through 17.

At 2115, the UE or base station may identify a first routing identifier in the first downlink grant, the first routing identifier indicating at least a third wireless device. The operations of 2115 may be performed according to the methods described herein. In some examples, aspects of the operations of 2115 may be performed by a routing identifier component as described with reference to FIGS. 13 through 17.

At 2120, the UE or base station may transmit, to the third wireless device, a second downlink grant scheduling a second downlink resource. The operations of 2120 may be performed according to the methods described herein. In some examples, aspects of the operations of 2120 may be performed by a downlink grant transmitting component as described with reference to FIGS. 13 through 17.

At 2125, the UE or base station may transmit feedback information to the second wireless device with HARQ feedback for the delay-sensitive packet based on monitoring for the delay-sensitive packet on the first downlink resource, where the feedback information includes scheduling information associated with the second downlink grant, the second downlink resource, or both. The operations of 2125 may be performed according to the methods described herein. In some examples, aspects of the operations of 2125 may be performed by a feedback component as described with reference to FIGS. 13 through 17.

Figure 22:
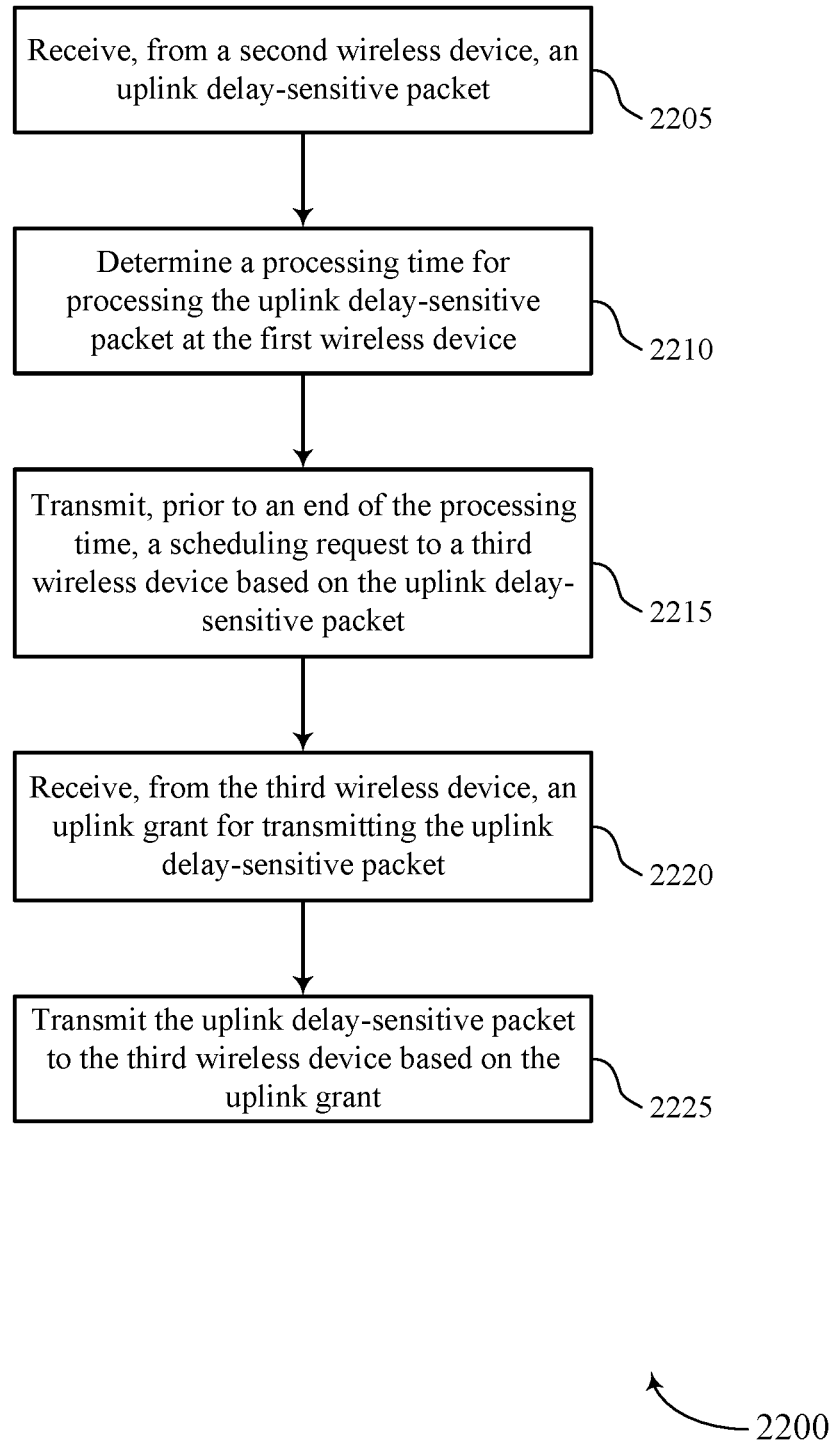

FIG. 22 shows a flowchart illustrating a method 2200 that supports in-advance scheduling for low latency traffic in accordance with aspects of the present disclosure. The operations of method 2200 may be implemented by a UE 115 or base station 105 or its components as described herein. For example, the operations of method 2200 may be performed by a communications manager as described with reference to FIGS. 13 through 17. In some examples, a UE or base station may execute a set of instructions to control the functional elements of the UE or base station to perform the functions described below. Additionally or alternatively, a UE or base station may perform aspects of the functions described below using special-purpose hardware.

At 2205, the UE or base station may receive, from a second wireless device, an uplink delay-sensitive packet. The operations of 2205 may be performed according to the methods described herein. In some examples, aspects of the operations of 2205 may be performed by an uplink packet receiving component as described with reference to FIGS. 13 through 17.

At 2210, the UE or base station may determine a processing time for processing the uplink delay-sensitive packet at the first wireless device. The operations of 2210 may be performed according to the methods described herein. In some examples, aspects of the operations of 2210 may be performed by an uplink packet processing component as described with reference to FIGS. 13 through 17.

At 2215, the UE or base station may transmit, prior to an end of the processing time, a scheduling request to a third wireless device based on the uplink delay-sensitive packet. The operations of 2215 may be performed according to the methods described herein. In some examples, aspects of the operations of 2215 may be performed by a scheduling request component as described with reference to FIGS. 13 through 17.

At 2220, the UE or base station may receive, from the third wireless device, an uplink grant for transmitting the uplink delay-sensitive packet. The operations of 2220 may be performed according to the methods described herein. In some examples, aspects of the operations of 2220 may be performed by an uplink grant component as described with reference to FIGS. 13 through 17.

At 2225, the UE or base station may transmit the uplink delay-sensitive packet to the third wireless device based on the uplink grant. The operations of 2225 may be performed according to the methods described herein. In some examples, aspects of the operations of 2225 may be performed by an uplink packet transmitting component as described with reference to FIGS. 13 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first wireless device, comprising:

receiving, from a second wireless device, a first downlink grant in downlink control information via a physical layer control channel scheduling a first downlink resource for a delay-sensitive packet;

monitoring the first downlink resource for the delay-sensitive packet from the second wireless device;

identifying a first routing identifier in the first downlink grant received in the downlink control information via the physical layer control channel, the first routing identifier indicating at least a third wireless device, the third wireless device identified from a routing table based at least in part on the first routing identifier, wherein the routing table comprises identifiers for a set of wireless devices; and transmitting, to the third wireless device, a second downlink grant scheduling a second downlink resource.

2. The method of claim 1, further comprising:
determining a processing time for processing the delay-sensitive packet, wherein the second downlink grant is transmitted prior to an end of the processing time.

3. The method of claim 2, wherein the second downlink grant is transmitted prior to the end of the processing time based at least in part on a scheduling gap between the second downlink grant and the second downlink resource for transmitting the delay-sensitive packet.

4. The method of claim 3, further comprising:
establishing a data bearer with at least the second wireless device and the third wireless device, wherein the routing table is configured during a data bearer setup phase to establish the data bearer.

5. The method of claim 1, further comprising:
receiving the delay-sensitive packet from the second wireless device on the first downlink resource based at least in part on the monitoring.

6. The method of claim 1, further comprising:
transmitting the delay-sensitive packet to the third wireless device on the second downlink resource based at least in part on the second downlink grant.

7. The method of claim 6, further comprising:
processing the delay-sensitive packet successfully, wherein the delay-sensitive packet is transmitted to the third wireless device based at least in part on processing the delay-sensitive packet successfully.

8. The method of claim 1, further comprising:
determining a low priority data packet is scheduled for the second downlink resource;
dropping transmission of the low priority data packet; and
transmitting the delay-sensitive packet on the second downlink resource based at least in part on the determining.

9. The method of claim 1, further comprising:
determining a low priority data packet is scheduled for the first downlink resource;
dropping reception of the low priority data packet; and
monitoring for the delay-sensitive packet on the first downlink resource based at least in part on the determining.

10. The method of claim 1, further comprising:
receiving a cancellation indication from the second wireless device; and
ceasing to monitor the first downlink resource for the delay-sensitive packet.

11. The method of claim 1, further comprising:
processing the delay-sensitive packet;
determining the delay-sensitive packet is unsuccessfully processed based at least in part on a cyclic redundancy check of the delay-sensitive packet; and
transmitting a cancellation indication to the third wireless device based at least in part on transmitting the second downlink grant.

12. The method of claim 1, further comprising:
transmitting feedback information to the second wireless device with hybrid automatic repeat request (HARQ) feedback for the delay-sensitive packet based at least in part on monitoring for the delay-sensitive packet on the first downlink resource, wherein the feedback information comprises scheduling information associated with the second downlink grant, the second downlink resource, or both.

13. The method of claim 12, wherein:
receiving updated scheduling information from the second wireless device based at least in part on the feedback information, wherein the updated scheduling information indicates a different transmission from the second wireless device is scheduled for the first wireless device on the second downlink resource.

14. The method of claim 1, further comprising:
receiving feedback information for the delay-sensitive packet from the third wireless device, wherein the feedback information comprises scheduling information associated with a third downlink grant, a third downlink resource, or both; and
scheduling another transmission for the third downlink resource based at least in part on the feedback information.

15. The method of claim 1, further comprising:
identifying a downlink control channel occasion, wherein the second downlink grant is transmitted in the downlink control channel occasion, and wherein the identifying of the downlink control channel occasion is based at least in part on a scheduling gap between the second downlink grant and the second downlink resource.

16. The method of claim 15, wherein the scheduling gap spans a plurality of slots.

17. The method of claim 15, wherein the scheduling gap spans a single slot, the single slot comprising a plurality of mini-slots.

18. The method of claim 1, further comprising:
processing the delay-sensitive packet, the processing comprising decoding the delay-sensitive packet, processing Layer 2 information of the delay-sensitive packet, encoding the delay-sensitive packet for transmission, or any combination thereof.

19. The method of claim 1, further comprising:
indicating to the third wireless device, via the second downlink grant, that downlink control information carrying the second downlink grant supports in-advance scheduling.

20. The method of claim 1, further comprising:
identifying, based at least in part on the first downlink grant, that downlink control information carrying the first downlink grant supports in-advance scheduling.

21. The method of claim 1, wherein the second downlink grant comprises a second routing identifier based at least in part on the first routing identifier.

22. A method for wireless communications at a first wireless device, comprising:
receiving, from a second wireless device, an uplink delay-sensitive packet;
determining a processing time for processing the uplink delay-sensitive packet at the first wireless device;
transmitting, prior to an end of the processing time, a scheduling request and a routing identifier for the uplink delay-sensitive packet to a third wireless device based at least in part on the uplink delay-sensitive packet, wherein the routing identifier comprises an identifier for one or more wireless devices, the routing identifier indicating for the third wireless device to transmit the uplink delay-sensitive packet to at least one of the one or more wireless devices;

receiving, from the third wireless device, an uplink grant for transmitting the uplink delay-sensitive packet; and transmitting the uplink delay-sensitive packet to the third wireless device based at least in part on the uplink grant.

23. The method of claim 22, further comprising:

receiving, from the second wireless device, routing identifiers for a plurality of wireless devices; and determining a set of transmission paths from the first wireless device to a donor node, wherein the scheduling request is transmitted to the third wireless device based at least in part on a shortest transmission path of the set of transmission paths.

24. The method of claim 22, further comprising:

establishing a data bearer with at least the second wireless device and the third wireless device, wherein a routing table is configured during a data bearer setup phase to establish the data bearer, and a routing identifier for the uplink delay-sensitive packet is identified based at least in part on the routing table.

25. An apparatus for wireless communications at a first wireless device, comprising:

a processor, memory electronically coupled with the processor; and instructions stored in the memory and executable by the processor to cause the apparatus to:

receive, from a second wireless device, a first downlink grant in downlink control information via a physical layer control channel signaling scheduling a first downlink resource for a delay-sensitive packet;

monitor the first downlink resource for the delay-sensitive packet from the second wireless device;

identify a first routing identifier in the first downlink grant received in the downlink control information via the physical layer control channel, the first routing identifier indicating at least a third wireless device, the third device identified from a routing table based at least in part on the first routing identifier, wherein the routing table comprises identifiers for a set of wireless devices; and transmit, to the third wireless device, a second downlink grant scheduling a second downlink resource.

26. An apparatus for wireless communications at a first wireless device, comprising:

a processor, memory electronically coupled with the processor; and instructions stored in the memory and executable by the processor to cause the apparatus to:

receive, from a second wireless device, an uplink delay-sensitive packet;

determine a processing time for processing the uplink delay-sensitive packet at the first wireless device;

transmit, prior to an end of the processing time, a scheduling request and a routing identifier for the uplink delay-sensitive packet to a third wireless device based at least in part on the uplink delay-sensitive packet, wherein the routing identifier comprises an identifier for one or more wireless devices, the routing identifier indicating for the third wireless device to transmit the uplink delay-sensitive packet to at least one of the one or more wireless devices;

receive, from the third wireless device, an uplink grant for transmitting the uplink delay-sensitive packet; and transmit the uplink delay-sensitive packet to the third wireless device based at least in part on the uplink grant.

\* \* \* \* \*